(12) United States Patent
Ishida et al.

(10) Patent No.: US 9,529,146 B2
(45) Date of Patent: Dec. 27, 2016

(54) MULTICORE FIBER AND METHOD OF MANUFACTURE OF THE SAME

(71) Applicant: FUJIKURA LTD., Tokyo (JP)

(72) Inventors: Itaru Ishida, Sakura (JP); Shoichiro Matsuo, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/541,340

(22) Filed: Nov. 14, 2014

(65) Prior Publication Data

US 2015/0139596 A1 May 21, 2015

(30) Foreign Application Priority Data

Nov. 18, 2013 (JP) ................................. 2013-238269

(51) Int. Cl.
*G02B 6/02* (2006.01)
*G02B 6/036* (2006.01)

(52) U.S. Cl.
CPC ....... *G02B 6/02042* (2013.01); *C03B 2203/14* (2013.01); *C03B 2203/302* (2013.01); *C03B 2205/14* (2013.01); *G02B 6/02314* (2013.01); *G02B 6/0365* (2013.01)

(58) Field of Classification Search
CPC ........ G02B 6/02042; C03B 2203/14–2203/16; C03B 2203/302; C03B 2205/14
See application file for complete search history.

(56) References Cited

U.S. PATENT DOCUMENTS

| | | | |
|---|---|---|---|
| 6,041,154 | A | 3/2000 | Ono et al. |
| 6,078,716 | A | 6/2000 | Huang et al. |
| 6,460,378 | B1 | 10/2002 | Dong et al. |
| 2012/0134637 | A1 | 5/2012 | Imamura |
| 2013/0108206 | A1 | 5/2013 | Sasaoka et al. |
| 2013/0243384 | A1 | 9/2013 | Matsuo et al. |

FOREIGN PATENT DOCUMENTS

| | | |
|---|---|---|
| JP | 60-155542 A | 8/1985 |
| JP | 4-134402 A | 5/1992 |
| JP | 8-94864 A | 4/1996 |
| JP | H10-104443 A | 4/1998 |
| JP | 2001-287920 A | 10/2001 |
| JP | 2003-221254 A | 8/2003 |
| JP | 2012-118495 A | 6/2012 |
| JP | 2012-203035 A | 10/2012 |
| JP | 2013-80126 A | 5/2013 |
| JP | 2013-88457 A | 5/2013 |
| WO | 2011/114795 A1 | 9/2011 |

OTHER PUBLICATIONS

Office Action dated Aug. 4, 2015, issued in counterpart Japanese Patent Application No. 2013-238269, with English translation (9 pages).

*Primary Examiner* — Jerry Rahll
(74) *Attorney, Agent, or Firm* — Westerman, Hattori, Daniels & Adrian, LLP

(57) ABSTRACT

A multicore fiber includes a plurality of cores and a cladding that encloses the plurality of the cores. The plurality of the cores is arranged and disposed on a linear line passed through the center of the cladding. A difference in the cutoff wavelength between an outer core located at the outermost position and an inner core located next to the outer core is set at a wavelength of 100 nm or less.

10 Claims, 20 Drawing Sheets

MULTICORE FIBER AND METHOD OF MANUFACTURE OF THE SAME

BACKGROUND OF THE INVENTION

The present invention relates to a multicore fiber and a method of manufacture of the multicore fiber, and is preferred to the case where the options of selecting a communication waveband are increased.

Presently, an optical fiber for use in a generally popular optical fiber communication system has a structure in which a single core is enclosed with a cladding and an optical signal is propagated through this core to transmit information.

In the optical fiber communication system in these years, a large number of optical fibers ranging from a few tens to a few hundreds optical fibers are used, and the volume of information transmitted are dramatically increased. In order to reduce the number of optical fibers in such an optical fiber communication system, such a multicore fiber is proposed in which a plurality of cores is enclosed with a cladding.

For example, Patent Document 1 below proposes a multicore fiber having a structure in which a plurality of cores is arranged side by side on a single linear line and the cores are entirely enclosed with a cladding.

CITATION LIST

Patent Document

[Patent Document 1] JP-A-10-104443

SUMMARY OF THE INVENTION

Meanwhile, Patent Document 1 describes that the cores of a multicore fiber obtained from a multicore fiber base material are sometimes elliptically deformed depending on the drawing conditions for the multicore fiber base material. Moreover, Patent Document 1 describes that when a multicore fiber base material having an inverse elliptic core inverse to the deforming direction of the cores is drawn, the cores of a multicore fiber obtained from the multicore fiber base material can be prevented from being deformed.

However, even though the drawing conditions, for example, for a multicore fiber base material are strictly limited, the cores of a multicore fiber obtained from the multicore fiber base material are prone to be not a little deformed.

In the case where the cores of the multicore fiber are deformed, fluctuations occur in the cutoff wavelengths of the cores. When the fluctuations become greater, a communication waveband in which light can be propagated in the single mode is narrowed, and as a result, the options of selecting a communication waveband are narrowed.

More specifically, in the case where a multicore fiber is used for a short distance in which the length of the multicore fiber is a length of 1,000 m or less, there is a concern that since the cutoff wavelengths of the cores of the multicore fiber are prone to become long, fluctuations in the cutoff wavelengths are further increased.

Therefore, it is an object of the present invention to provide a multicore fiber that can increase the options of selecting a communication waveband and a method of manufacture of the multicore fiber.

As a result of dedicated investigation conducted by the present inventors in order to solve the problem, it was found that in a multicore fiber having a structure in which a plurality of cores arranged and disposed on a linear line is enclosed with a cladding, cores disposed in the center are more prone to be deformed than cores disposed on the outer side among these cores. Therefore, the present inventors dedicatedly conducted investigation and made the present invention.

To solve the problem, the present invention provides a multicore fiber including: a plurality of cores; and a cladding that encloses the plurality of the cores, wherein the plurality of the cores is arranged and disposed on a linear line passed through a center of the cladding, and a difference in a cutoff wavelength between an outer core located at an outermost position and an inner core located next to the outer core is set at a wavelength of 100 nm or less.

In the multicore fiber, the difference in the cutoff wavelength between the inner core and the outer core, between which fluctuations in the cutoff wavelength most likely occur, is set at a wavelength of 100 nm or less, so that it is possible that the difference in the cutoff wavelength between all the cores adjacent to each other is set at a wavelength of 100 nm or less in the plurality of the cores enclosed with the cladding. Therefore, in accordance with the multicore fiber according to the present invention, it is possible to increase a communication waveband in which light can be propagated in the single mode, as compared with the case where the difference in the cutoff wavelength between the outer core and the inner core exceeds a wavelength of 100 nm. Accordingly, a multicore fiber that can increase the options of selecting a communication waveband is implemented.

Note that a distance between center axes of cores adjacent to each other is preferably set to a length in a range of 24 µm or more and 35 µm or less.

In the case where the distance between the center axes of the cores adjacent to each other is set to a length of 24 µm or more, it is possible to effectively suppress the crosstalk between the cores adjacent to each other. Moreover, in the case where the distance between the center axes of the cores adjacent to each other is set to a length of 35 µm or less, it is possible to suppress an increase in the outer diameter of the multicore fiber.

Moreover, a shortest distance between an outer circumferential surface of the outer core and an outer circumferential surface of the cladding is preferably set to a length in a range of 15 µm or more and 62.5 µm or less.

In this case, it is possible to reduce the diameter while effectively suppressing the influence of disturbance with respect to the core.

Moreover, preferably, the multicore fiber further includes: an inner cladding layer that encloses the core and has an average refractive index lower than an average refractive index of the core; and a trench layer that encloses the inner cladding layer and has an average refractive index lower than the average refractive index of the inner cladding layer.

In this case, it is possible to suppress the crosstalk between the cores adjacent to each other, as compared with the case where the inner cladding layer and the trench layer are not included.

Moreover, preferably, the multicore fiber further includes a barrier layer disposed between cores adjacent to each other and having an average refractive index lower than an average refractive index of the core and an average refractive index of the cladding.

In this case, it is possible to suppress the crosstalk between the cores adjacent to each other, as compared with the case where the barrier layer is not provided.

Moreover, preferably, the multicore fiber further includes a hole disposed between cores adjacent to each other.

In this case, it is possible to suppress the crosstalk between the cores adjacent to each other, as compared with the case where the hole is not provided.

Moreover, the hole is preferably disposed at a center position between center axes of the cores.

In this case, it is possible to suppress the crosstalk between the cores while suppressing the influence of disturbance with respect to the cores, as compared with the case where the hole is disposed at the position other than the center position between the center axes of the cores adjacent to each other.

Moreover, preferably, the multicore fiber further includes a pair of holes disposed in a second direction orthogonal to a first direction in which the plurality of the cores is arranged as the core is sandwiched.

In this case, it is possible to further suppress the crosstalk between the cores adjacent to each other, as compared with the case where the pair of the holes is not disposed in the second direction orthogonal to the first direction in which the plurality of the cores is arranged.

Moreover, to solve the problem, the present invention provides a first method of manufacture of a multicore fiber including: boring a plurality of through holes in a cladding rod so that the through holes along a longitudinal direction of the cladding rod are arranged and disposed on a linear line passed through a center of the cladding rod; inserting a core enclosed rod that a core rod is enclosed with a glass layer individually into the plurality of the through holes; heating the cladding rod and the core enclosed rod and integrally forming the cladding rod with the core enclosed rod; and drawing the rods integrally formed in the integrating, wherein the plurality of the through holes includes a pair of outer through holes located at outermost positions and one or more of inner through holes sandwiched between the pair of the through holes, the core rod in the core enclosed rod inserted into the outer through hole in the inserting includes a diameter in a first direction, in which the plurality of the through holes is arranged, almost same as a diameter in a second direction orthogonal to the first direction, and the core rod in the core enclosed rod inserted into the inner through hole in the inserting includes a diameter in the first direction smaller than a diameter in the second direction.

In the case where the cladding rod and the core enclosed rod are heated in the integrating process, the stress is likely to be concentrated in the center of the cladding rod because of the contraction or the like of the cladding rod, and a greater stress is applied to the inner through hole than to the outer through hole. Moreover, in the cladding rod, since the total amount of the spaces of the through holes is greater in the first direction than in the second direction orthogonal to the first direction in which the plurality of the through holes is arranged, a greater stress is applied to the through holes in the second direction than in the first direction.

In the first manufacture method for the multicore fiber according to the present invention, the core rod in the core enclosed rod inserted into the inner through hole in the inserting process includes the diameter in the first direction made smaller than the diameter in the second direction.

Therefore, in the inner through hole to which a greater stress is applied in the second direction than in the first direction, the core rod in the core enclosed rod inserted into the inner through hole is deformed in the first direction. On the other hand, in the outer through hole to which stress is less applied than to the inner through hole, the core rod in the core enclosed rod inserted into the outer through hole is not generally deformed.

Therefore, in the first manufacture method, it is possible to deform the outer shape of the core rod in the core enclosed rod inserted into the inner through hole so as to come close to the outer shape of the core rod in the core enclosed rod inserted into the outer through hole.

As described above, according to the first manufacture method, a multicore fiber in which the shapes of the cores are almost the same can be obtained, so that it is possible to suppress fluctuations in the cutoff wavelengths of the cores adjacent to each other, and it is possible to increase a communication waveband in which light can be propagated in the single mode. Accordingly, a method of manufacture of a multicore fiber that can increase the options of selecting a communication waveband is implemented.

Moreover, to solve the problem, the present invention provides another method of manufacture of a multicore fiber including: boring a plurality of through holes in a cladding rod so that the through holes along a longitudinal direction of the cladding rod are arranged and disposed on a linear line passed through a center of the cladding rod; inserting a core enclosed rod that a core rod is enclosed with a glass layer individually into the plurality of the through holes; heating the cladding rod and the core enclosed rod and integrally forming the cladding rod with the core enclosed rod; and drawing the rods integrally formed in the integrating, wherein the plurality of the through holes includes a pair of outer through holes located at outermost positions and one or more of inner through holes sandwiched between the pair of the through holes, in the inserting, a first space between the core enclosed rod and the inner through hole in a first direction, in which the plurality of the through holes is arranged, is made smaller than a second space between the core enclosed rod and the inner through hole in a second direction orthogonal to the first direction, and a difference between the first space and the second space is set greater than a difference between a third space and a fourth space, the third space being between the core enclosed rod and the outer through hole in the first direction, the fourth space being between the core enclosed rod and the outer through hole in the second direction.

In the manufacture method, the first space between the through hole and the core enclosed rod in the first direction in which the plurality of the through holes is arranged is made smaller than the second space between the through hole and the core enclosed rod in the second direction orthogonal to the first direction. Therefore, even though a larger stress is applied to the inner through hole in the first direction than in the second direction, the amount of stress per unit time applied to the core enclosed rod in the inner through hole is almost the same in the first direction and in the second direction.

Moreover, in the manufacture method, the difference between the first space and the second space in the inner through hole is made greater than the difference between the third space and the fourth space in the outer through hole. Therefore, even though the stress applied to the inner through hole is greater than the stress applied to the outer through hole, the amount of stress per unit time applied to the core enclosed rod in the through hole is made almost the same between the core enclosed rods.

Therefore, in the manufacture method, even though the stress applied to the through holes is varied, it is possible to deform the outer shape of the core enclosed rod in the outer through hole almost the same as the core enclosed rod in the inner through hole.

According to the manufacture method, a multicore fiber in which the shapes of the cores are almost the same can be obtained, so that it is possible to increase a communication waveband in which light can be propagated in the single mode as similar to the first manufacture method for the multicore fiber. Accordingly, a method of manufacture of a multicore fiber that can increase the options of selecting a communication waveband is implemented.

It is noted that the difference between the first space and the second space can be provided as follows. That is, the inner through hole includes a diameter in the first direction almost same as a diameter in the second direction, and the core enclosed rod inserted into the inner through hole includes a diameter in the second direction made smaller than a diameter in the first direction. For example, the outer shape of the inner through hole in the cross section is in a circular shape, and the outer shape of the core enclosed rod in the cross section is in an elliptic shape.

Alternatively, the difference between the first space and the second space can also be provided as follows. That is, the inner through hole includes a diameter in the first direction smaller than a diameter in the second direction, and the core enclosed rod inserted into the inner through hole includes a diameter in the first direction almost same as a diameter in the second direction. For example, the outer shape of the inner through hole in the cross section is in an elliptic shape, and the outer shape of the core enclosed rod in the cross section is in a circular shape.

Moreover, to solve the problem, the present invention provides a method of manufacture of a multicore fiber including: boring a plurality of through holes in a cladding rod so that the through holes along a longitudinal direction of the cladding rod are arranged and disposed on a linear line passed through a center of the cladding rod; inserting a core enclosed rod that a core rod is enclosed with a glass layer individually into the plurality of the through holes; heating the cladding rod and the core enclosed rod and integrally forming the cladding rod with the core enclosed rod; and drawing the rods integrally formed in the integrating, wherein the plurality of the through holes includes a pair of outer through holes located at outermost positions and one or more of inner through holes sandwiched between the pair of the through holes, and in the boring, a pair of stress buffering holes filled in the integrating is bored in the second direction as the inner through hole is sandwiched.

In the manufacture method, the pair of the stress buffering holes filled in the integrating process is bored in the second direction as the inner through hole is sandwiched. Therefore, even though the stress applied to the inner through hole is greater in the second direction than in the first direction, the amount of stress per unit time applied to the core enclosed rod in the inner through hole is made almost the same in the first direction and in the second direction because of the stress buffering holes bored in the second direction.

Therefore, in the manufacture method, even though the stress applied to the through holes is varied, it is possible to deform the core enclosed rod in the inner through hole almost the same as the shape of the core enclosed rod in the outer through hole.

According to the manufacture method, a multicore fiber in which the shapes of the cores are almost the same can be obtained, so that it is possible to increase a communication waveband in which light can be propagated in the single mode as similar to the first or second manufacture method for the multicore fiber. Accordingly, a method of manufacture of a multicore fiber that can increase the options of selecting a communication waveband is implemented.

It is noted that the integrating process and the drawing process can be performed simultaneously.

As described above, according to the present invention, there is provided a multicore fiber that can increase the options of selecting a communication waveband and a method of manufacture of the multicore fiber.

DETAILED DESCRIPTION OF THE INVENTION

In the following, preferred embodiments for implementing the present invention will be described in detail with reference to the drawings.

1-1. First Embodiment

Figure 1:
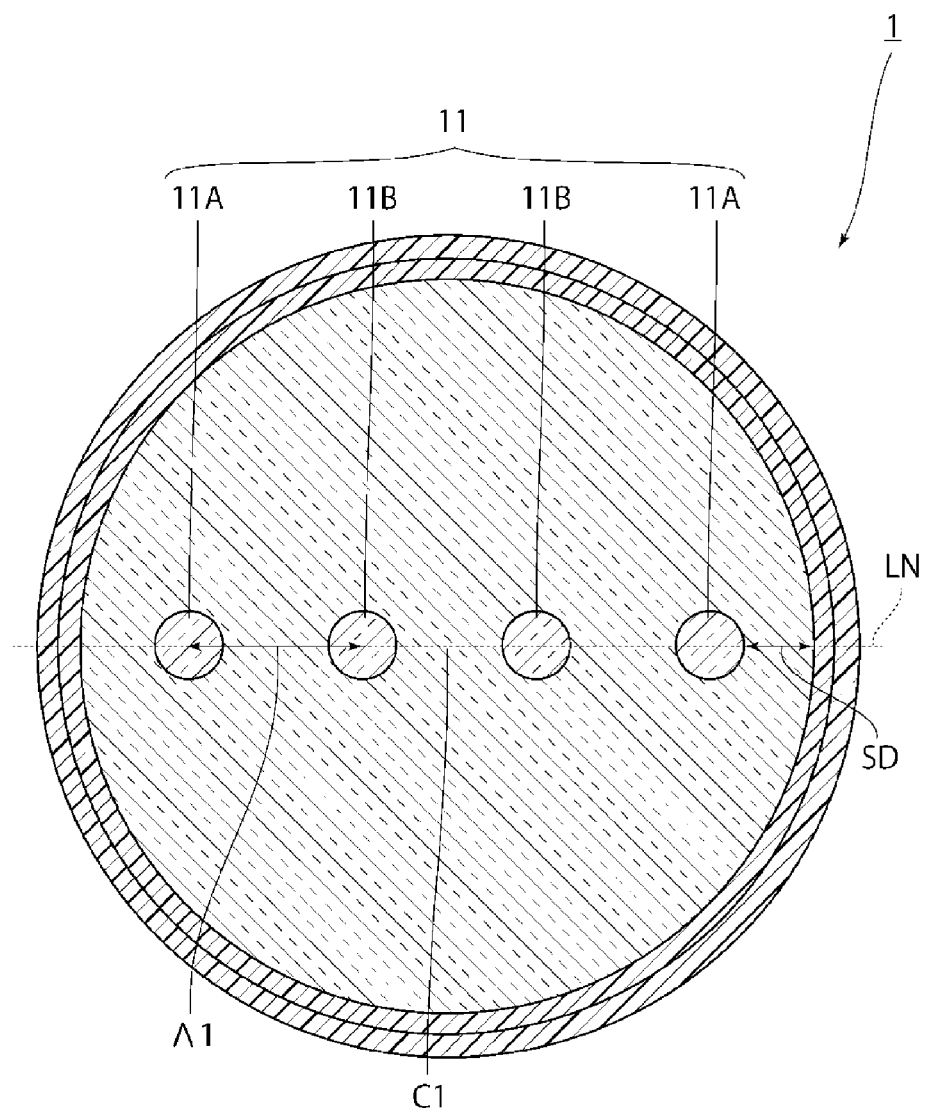
FIG. 1 is a diagram of a cross section perpendicular to the longitudinal direction of a multicore fiber according to a first embodiment.

FIG. 1 is a diagram of a cross section perpendicular to the longitudinal direction of a multicore fiber 1 according to a first embodiment. As illustrated in FIG. 1, the multicore fiber 1 according to the embodiment includes a plurality of cores 11, a cladding 12 that encloses the plurality of cores 11, a first protective layer 13 that encloses the cladding 12, and a second protective layer 14 that encloses the first protective layer 13 as main components.

The plurality of the cores 11 is arranged and disposed on a linear line LN passed through a center C1 of the cladding 12. In other words, the plurality of the cores 11 includes a pair of outer cores 11A located at the outermost positions and inner cores 11B sandwiched between the pair of the outer cores 11A, and the outer cores 11A and the inner cores 11B are disposed along the radial direction of the cladding 12.

It is noted that in FIG. 1, the case is illustrated where the number of the inner cores 11B is two and the number of the core 11 is four. However, it may be fine that numbers other than the numbers illustrated in FIG. 1 are applied as long as the number of the inner cores 11B is one or more and the number of the cores 11 is three or more. Moreover, in FIG. 1, the centers of the cores 11 are located on the linear line LN passed through the center C1 of the cladding 12. However, it may be fine that the centers of the cores 11 are at positions displaced from the linear line passed through the center C1 of the cladding 12 as long as the cores 11 are arranged and disposed on the linear line LN.

The difference in the cutoff wavelength between the outer core 11A and the inner core 11B located next to the outer core 11A is set at a wavelength of 100 nm or less. Moreover, a distance Λ1 between the center axes of the cores adjacent to each other is set within a range of 24 μm or more and 35 μm or less, and a shortest distance SD between the outer circumferential surface of the outer core 11A and the outer circumferential surface of the cladding 12 is set within a range of 15 μm or more and 62.5 μm or less.

In the multicore fiber 1 described above, the difference in the cutoff wavelength between the outer core 11A and the inner core 11B, between which fluctuations in the cutoff wavelength most likely occur, is set at a wavelength of 100 nm or less, so that it is possible that the difference in the cutoff wavelength between all the cores adjacent to each other is set at a wavelength of 100 nm or less in the plurality of the cores 11 enclosed with the cladding 12.

Therefore, in accordance with the multicore fiber according to the embodiment, it is possible to increase a communication waveband in which light can be propagated in the single mode, as compared with the case where the difference in the cutoff wavelength between the outer core 11A and the inner core 11B exceeds a wavelength of 100 nm. Thus, the multicore fiber 1 that can increase the options of selecting a communication waveband is implemented.

Moreover, in the embodiment, the distance Λ1 between the center axes of the cores adjacent to each other is set to a length of 24 μm or more, so that it is possible to effectively suppress the crosstalk between the cores adjacent to each other. Furthermore, the distance Λ1 between the center axes of the cores adjacent to each other is set to a length of 35 μm or less, so that it is possible to suppress an increase in the outer diameter of the multicore fiber 1.

In addition, in the embodiment, the shortest distance SD between the outer circumferential surface of the outer core 11A and the outer circumferential surface of the cladding 12 is set to a length in a range of 15 μm or more and 62.5 μm or less, so that it is possible to reduce the diameter while effectively suppressing the influence of disturbance with respect to the cores 11. It is noted that the shortest distance SD is more preferably set to a length in a range of 20 μm or more and 35 μm or less.

It is noted that although the length of the multicore fiber 1 according to the embodiment is not specified more specifically, the effect described above can be obtained even though the length of the multicore fiber 1 is a length of 1,000 m or less.

1-2. Second Embodiment

Next, a second embodiment will be described in detail with reference to the drawings. However, components the same as or equivalent to the components of the first embodiment are designated the same reference numerals and signs, and the overlapping description will be appropriately omitted in the components of a multicore fiber according to the second embodiment.

Figure 2:
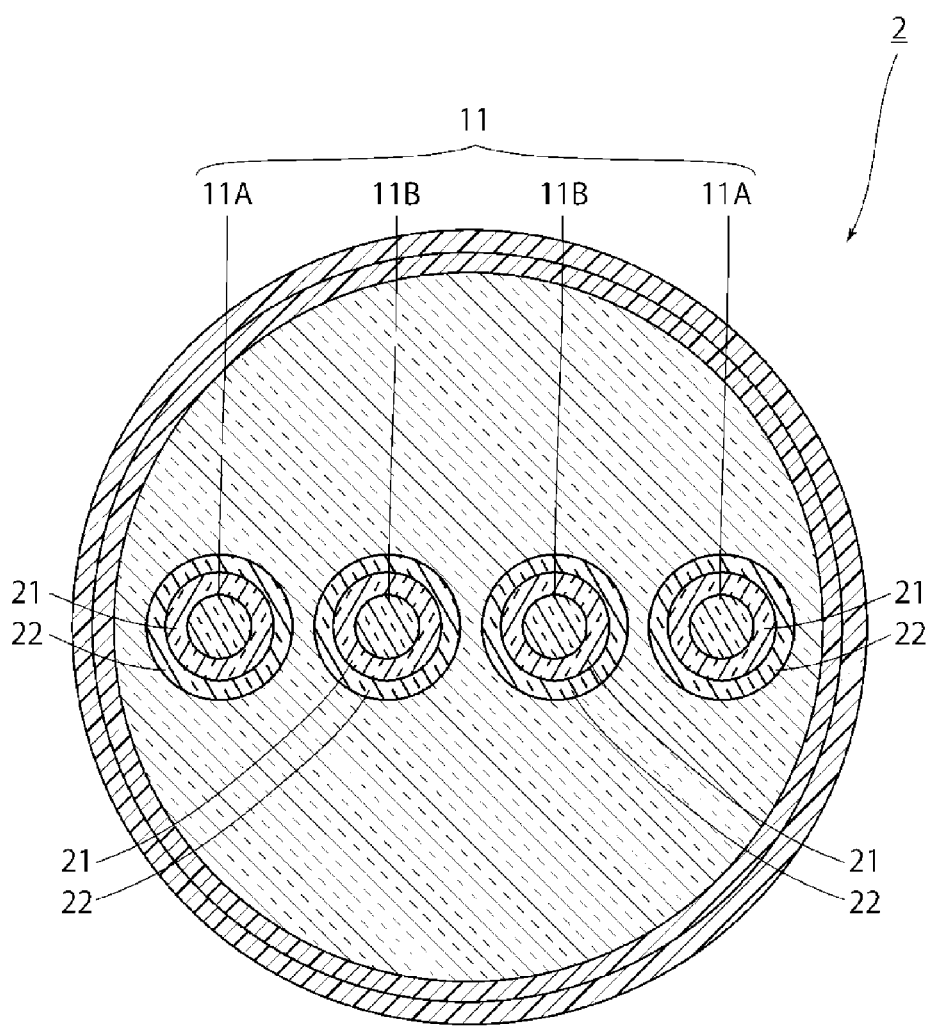
FIG. 2 is a diagram of a cross section perpendicular to the longitudinal direction of a multicore fiber according to a second embodiment.

FIG. 2 is a diagram of a cross section perpendicular to the longitudinal direction of a multicore fiber 2 according to the second embodiment. As illustrated in FIG. 2, the multicore fiber 2 according to the embodiment is different from the multicore fiber 1 according to the first embodiment in that an inner cladding layer 21 and a trench layer 22 are further included.

Figure 3:
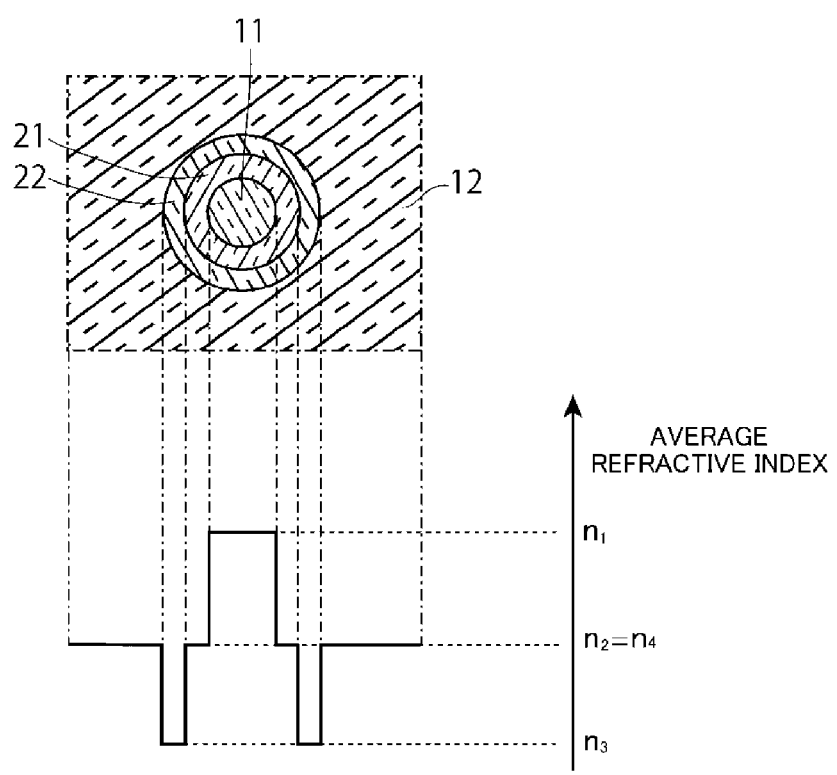
FIG. 3 is a diagram of the refractive index profile of the inside of a cladding according to the second embodiment.

FIG. 3 is a diagram of the refractive index profile of the inside of a cladding 12 according to the second embodiment. As illustrated in FIG. 3, the inner cladding layer 21 encloses a core 11, and has an average refractive index $n_2$ lower than an average refractive index $n_1$ of the core 11. The trench layer 22 encloses the inner cladding layer 21, and has an average refractive index $n_3$ lower than the average refractive index $n_2$ of the inner cladding layer 21 and an average refractive index $n_4$ of the cladding 12.

It is noted that in FIG. 3, although the average refractive index $n_2$ of the inner cladding layer 21 is almost the same as the average refractive index $n_4$ of the cladding 12, the average refractive index $n_2$ of the inner cladding layer 21 may be higher or lower than the average refractive index $n_4$ of the cladding 12.

According to the multicore fiber 2 described above, it is possible to suppress the crosstalk between the cores adjacent to each other, as compared with the case of the first embodiment where the inner cladding layer 21 and the trench layer 22 are not included.

It is noted that although the length of the multicore fiber 2 according to the embodiment is not specified more specifically, the effect described above can be obtained even though the length of the multicore fiber 2 is a length of 1,000 m or less.

1-3. Third Embodiment

Next, a third embodiment will be described in detail with reference to the drawings. However, components the same as or equivalent to the components of the embodiments are designated the same reference numerals and signs, and the overlapping description will be appropriately omitted in the components of a multicore fiber according to the third embodiment.

Figure 4:
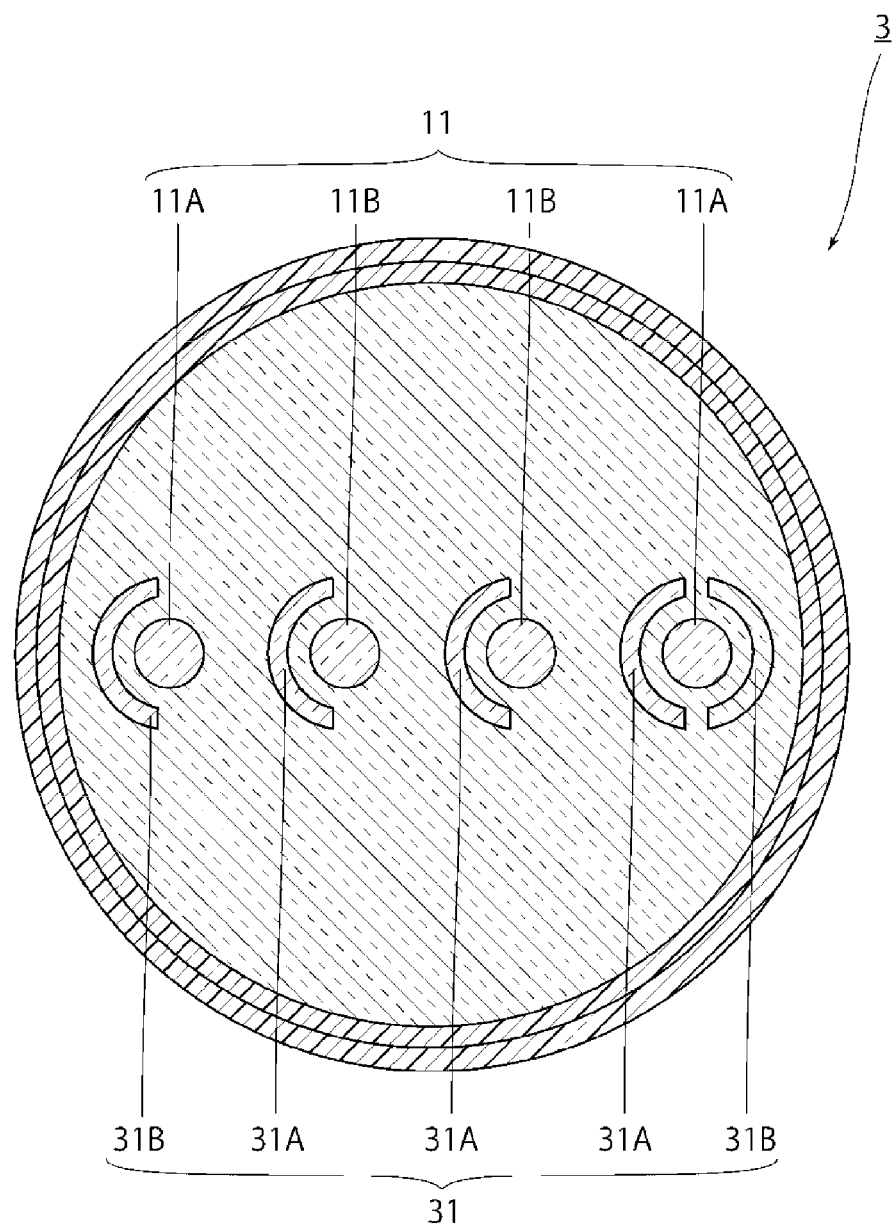
FIG. 4 is a diagram of a cross section perpendicular to the longitudinal direction of a multicore fiber according to a third embodiment.

FIG. 4 is a diagram of a cross section perpendicular to the longitudinal direction of a multicore fiber 3 according to the third embodiment. As illustrated in FIG. 4, the multicore fiber 3 according to the embodiment is different from the multicore fiber 1 according to the first embodiment in that a barrier layer 31 is further included.

Figure 5:
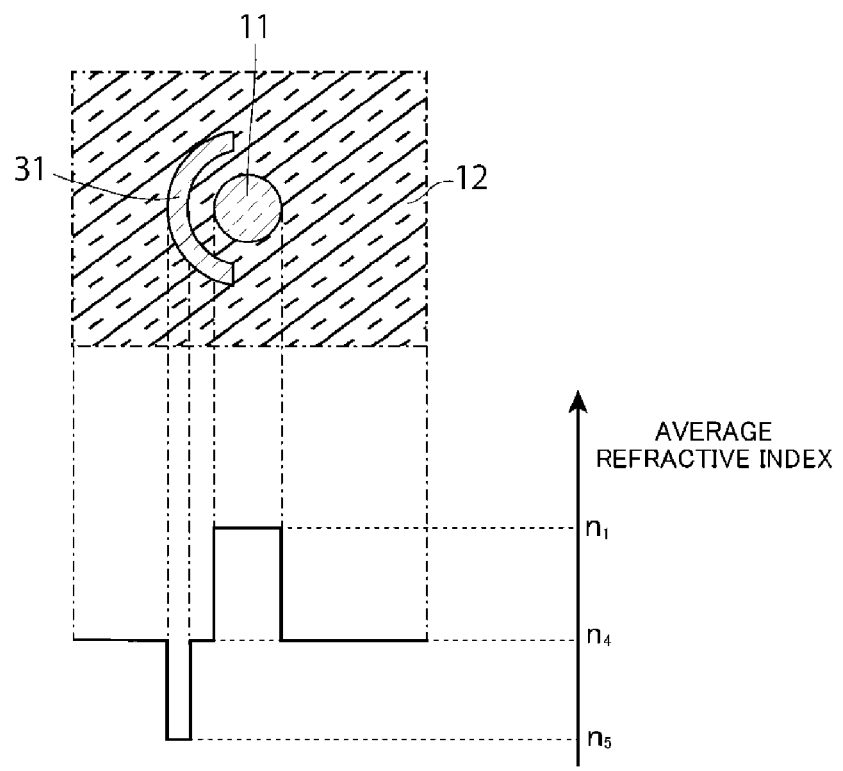
FIG. 5 is a diagram of the refractive index profile of the inside of a cladding according to the third embodiment.

The barrier layer 31 includes a first barrier layer 31A disposed between the cores adjacent to each other and a second barrier layer 31B disposed between an outer core 11A and the outer circumferential surface of a cladding 12. FIG. 5 is a diagram of the refractive index profile of the inside of the cladding 12 according to the third embodiment. As illustrated in FIG. 5, an average refractive index $n_5$ of the barrier layer 31 (the first barrier layer 31A and the second barrier layer 31B) is set lower than the average refractive index $n_1$ of the core 11 and the average refractive index $n_4$ of the cladding 12.

It is noted that in FIG. 4, the case is illustrated where the cross sectional forms of the first barrier layer 31A and the second barrier layer 31B are in an arc shape. However, it may be fine that the cross sectional forms other than an arc shape is adapted. Moreover, in FIG. 4, the case is illustrated where the cross sectional areas of the first barrier layer 31A and the second barrier layer 31B are the same. However, it may be fine that the cross sectional areas are different.

In the case of the embodiment, the first barrier layer 31A is disposed between the center axes of the cores adjacent to each other, and the second barrier layer 31B is disposed between the outer core 11A and the outer circumferential surface of the cladding 12 closest to the outer core 11A.

In the multicore fiber 3 described above, the first barrier layer 31A is disposed between the cores adjacent to each other, so that it is possible to suppress the crosstalk between the cores adjacent to each other, as compared with the case of the first embodiment where the first barrier layer 31A is not provided.

Moreover, in the embodiment, the second barrier layer 31B is disposed between the outer core 11A and the outer circumferential surface of the cladding 12, so that it is possible to suppress the transmission loss of the outer core 11A, as compared with the case where the second barrier layer 31B is not disposed.

It is noted that although the length of the multicore fiber 3 according to the embodiment is not specified more specifically, the effect described above can be obtained even though the length of the multicore fiber 3 is a length of 1,000 m or less.

1-4. Fourth Embodiment

Next, a fourth embodiment will be described in detail with reference to the drawing. However, components the same as or equivalent to the components of the embodiments are designated the same reference numerals and signs, and the overlapping description will be appropriately omitted in the components of a multicore fiber according to the fourth embodiment.

Figure 6:
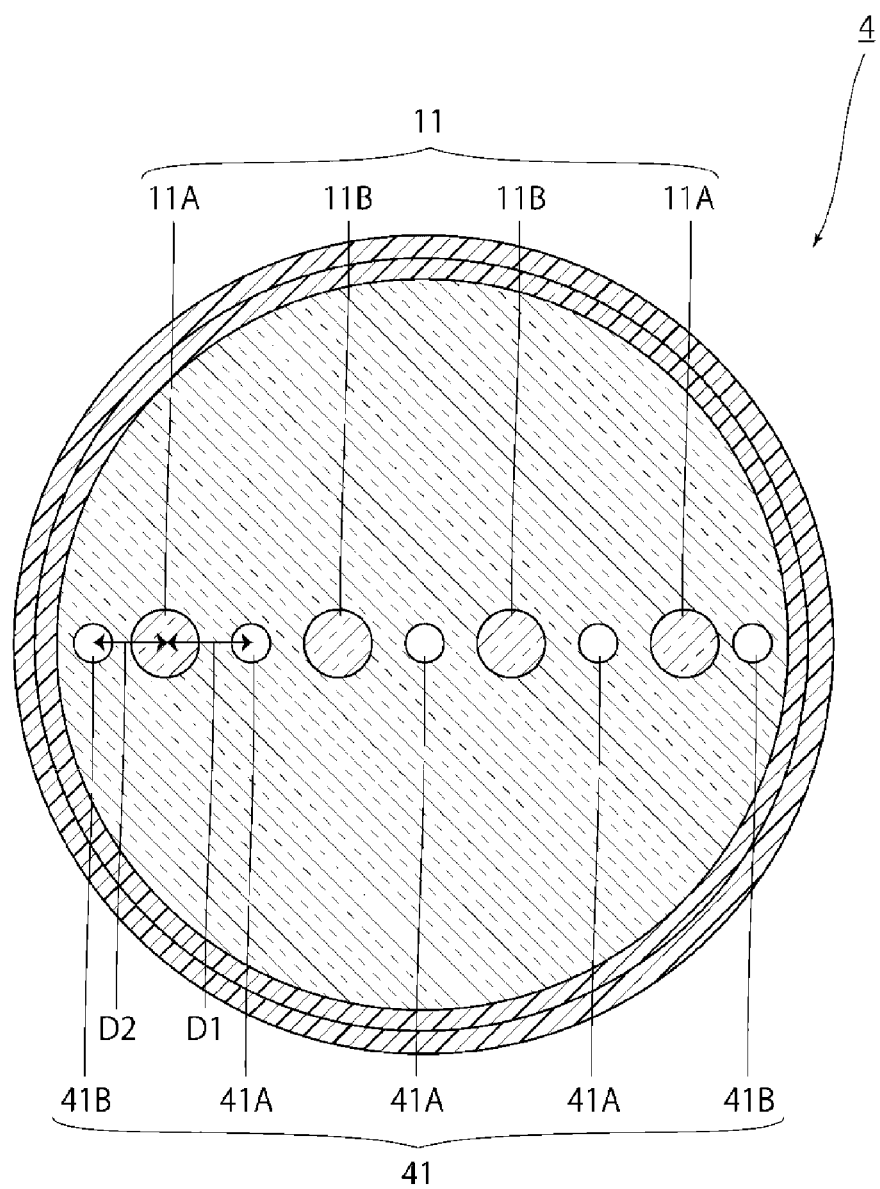
FIG. 6 is a diagram of a cross section perpendicular to the longitudinal direction of a multicore fiber according to a fourth embodiment.

FIG. 6 is a diagram of a cross section perpendicular to the longitudinal direction of a multicore fiber 4 according to the fourth embodiment. As illustrated in FIG. 6, the multicore fiber 4 according to the embodiment is different from the multicore fiber 1 according to the first embodiment in that a hole 41 is further included.

The hole 41 includes a first hole 41A disposed between the cores adjacent to each other and a second hole 41B disposed between an outer core 11A and the outer circumferential surface of a cladding 12. The first hole 41A and the second hole 41B are in the state in which the average refractive indexes are lower than the average refractive index of the core 11 and the average refractive index of the cladding 12.

It is noted that in FIG. 6, the case is illustrated where the cross sectional forms of the first hole 41A and the second hole 41B are in a circular shape. However, it may be fine that cross sectional forms other than a circular shape are adapted. Moreover, in FIG. 6, the case is illustrated where the cross sectional forms of the first hole 41A and the second hole 41B are the same. However, it may be fine that the cross sectional forms are different. Furthermore, in FIG. 6, the case is illustrated where the cross sectional areas of the first hole 41A and the second hole 41B are different from the cross sectional area of the core 11. However, it may be fine that the cross sectional areas are the same.

In the case of the embodiment, the first hole 41A is disposed at the center position between the center axes of the cores adjacent to each other, and the second hole 41B is disposed at the middle position between the outer core 11A and the outer circumferential surface of the cladding 12 closest to the outer core 11A.

It is noted that in FIG. 6, a distance D1 between the center axes of the core 11 and the first hole 41A is different from a distance D2 between the center axes of the core 11 and the second hole 41B. However, it may be fine that the distance D1 is almost the same as the distance D2.

In the multicore fiber 4 described above, the first hole 41A is disposed between the cores adjacent to each other, so that it is possible to suppress the crosstalk between the cores adjacent to each other, as compared with the case of the first embodiment where the first hole 41A is not provided.

In addition, in the embodiment, the second hole 41B is disposed between the outer core 11A and the outer circumferential surface of the cladding 12, so that it is possible to suppress the transmission loss of the outer core 11A, as compared with the case where the second hole 41B is not disposed.

Moreover, in the embodiment, the first hole 41A is disposed at the center position between the center axes of the cores adjacent to each other, so that it is possible to suppress the crosstalk between the cores while suppressing the influence of disturbance with respect to the cores 11, as compared with the case where the first hole 41A is not disposed at the center position.

Similarly, the second hole 41B is disposed at the middle position between the outer core 11A and the outer circumferential surface of the cladding 12 closest to the outer core 11A, so that it is possible to suppress the crosstalk between the cores while suppressing the influence of disturbance with respect to the cores 11, as compared with the case where the second hole 41B is not disposed at the center position.

It is noted that although the length of the multicore fiber 4 according to the embodiment is not specified more specifically, the effect described above can be obtained even though the length of the multicore fiber 4 is a length of 1,000 m or less.

1-5. Fifth Embodiment

Next, a fifth embodiment will be described in detail with reference to the drawing. However, components the same as or equivalent to the components of the embodiments are designated the same reference numerals and signs, and the overlapping description will be appropriately omitted in the components of a multicore fiber according to the fifth embodiment.

Figure 7:
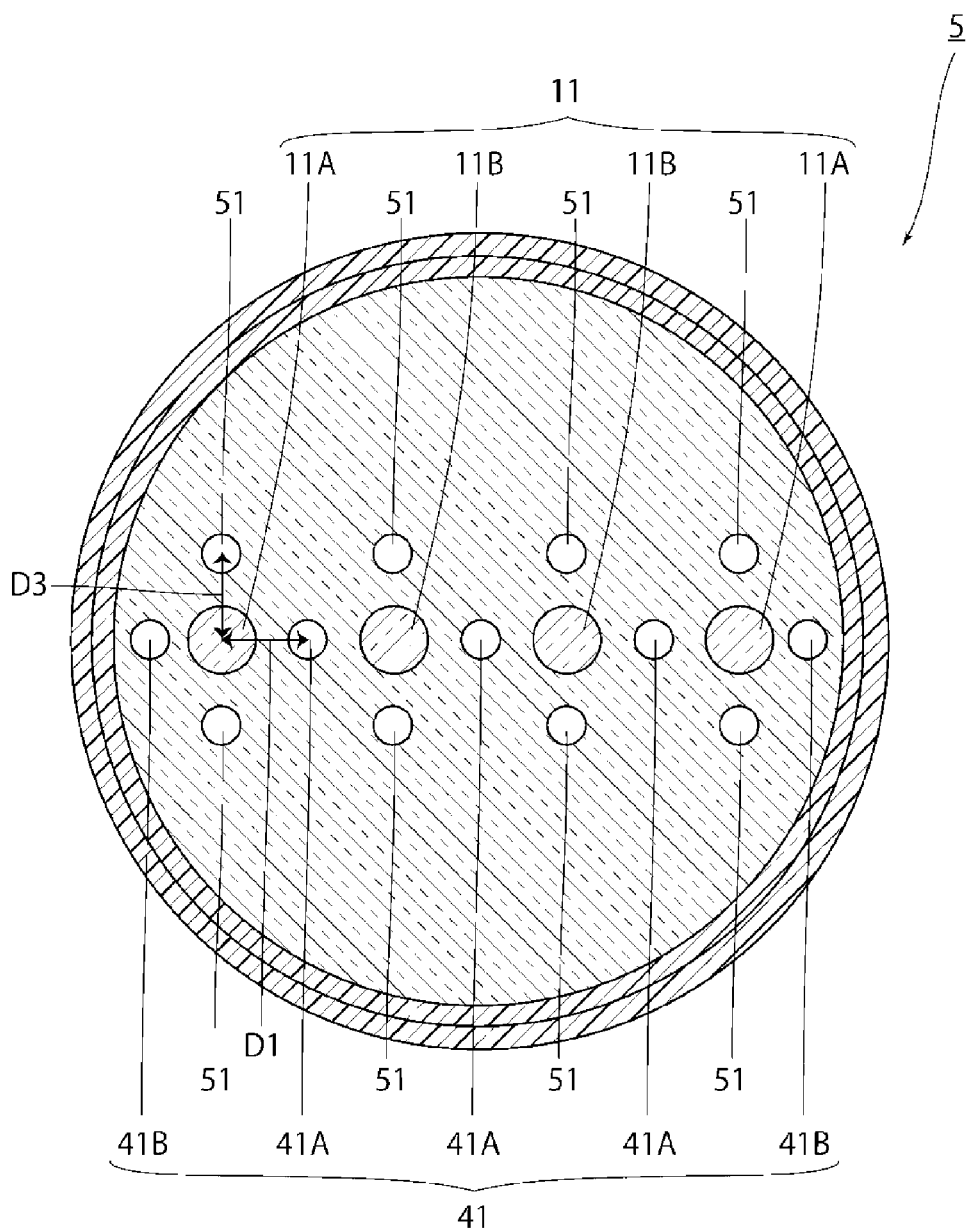
FIG. 7 is a diagram of a cross section perpendicular to the longitudinal direction of a multicore fiber according to a fifth embodiment.

FIG. 7 is a diagram of a cross section perpendicular to the longitudinal direction of a multicore fiber 5 according to the fifth embodiment. As illustrated in FIG. 7, the multicore fiber 5 according to the embodiment is different from the multicore fiber 4 according to the fourth embodiment in that a pair of holes 51 is further included, which are disposed in the second direction orthogonal to the first direction in which a plurality of cores is arranged as a core 11 is sandwiched.

In the case of the embodiment, a distance D3 between the center axes of the core 11 and the hole 51 is almost the same as a distance D1 between the center axes of the core 11 and a first hole 41A.

It is noted that in FIG. 7, the case is illustrated where the cross sectional form of the hole 51 is in a circular shape. However, it may be fine that cross sectional forms other than a circular shape are adapted. Moreover, in FIG. 7, the case is illustrated where the cross sectional forms of the hole 51 and the first hole 41A or the second hole 41B are the same. However, it may be fine that the cross sectional forms are different. Furthermore, in FIG. 7, the case is illustrated where the cross sectional area of the hole 51 and the cross sectional area of the core 11 are different. However, it may be fine that the cross sectional areas are the same.

In the multicore fiber 5 described above, it is possible to further suppress the crosstalk between the cores adjacent to each other, as compared with the case of the fourth embodiment where the pair of the holes 51 is not arranged in the second direction orthogonal to the first direction in which the plurality of the cores 11 is arranged.

Moreover, in the embodiment, the distance D1 between the core 11 and the hole 51 is almost the same as the distance D3 between the core 11 and the first hole 41A. Therefore, it is possible to suppress the occurrence of anisotropy in the electric field distribution of the core 11 and to provide excellent waveguide characteristics of the core 11, as compared with the case where the distance D1 between the core 11 and the hole 51 is not almost the same as the distance D3.

It is noted that although the length of the multicore fiber 5 according to the embodiment is not specified more specifically, the effect described above can be obtained even though the length of the multicore fiber 5 is a length of 1,000 m or less.

2-1. First Manufacture Method for the Multicore Fiber

Next, a first manufacture method for the multicore fiber will be described in detail with reference to the drawings. However, for convenience of explanation, the case will be described where the multicore fiber 1 according to the first embodiment is manufactured using the first manufacture method.

Figure 8:
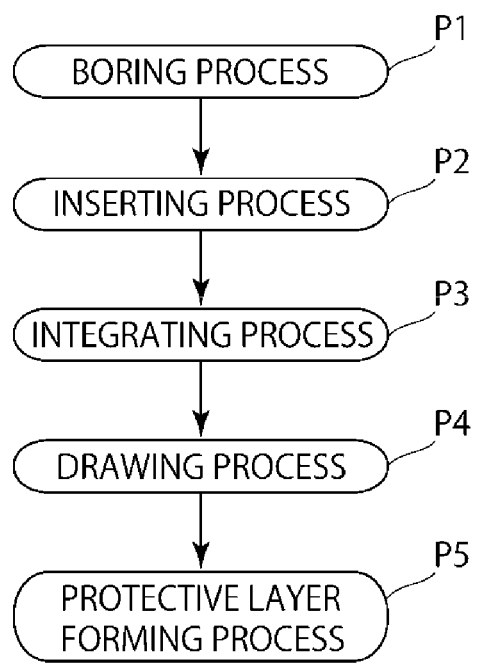
FIG. 8 is a flowchart of a first manufacture method for a multicore fiber.

FIG. 8 is a flowchart of the first manufacture method for the multicore fiber 1. As illustrated in FIG. 8, the first manufacture method includes a boring process P1, an inserting process P2, an integrating process P3, a drawing process P4, and a protective layer forming process P5 as main processes.

<Boring Process>

Figure 9:
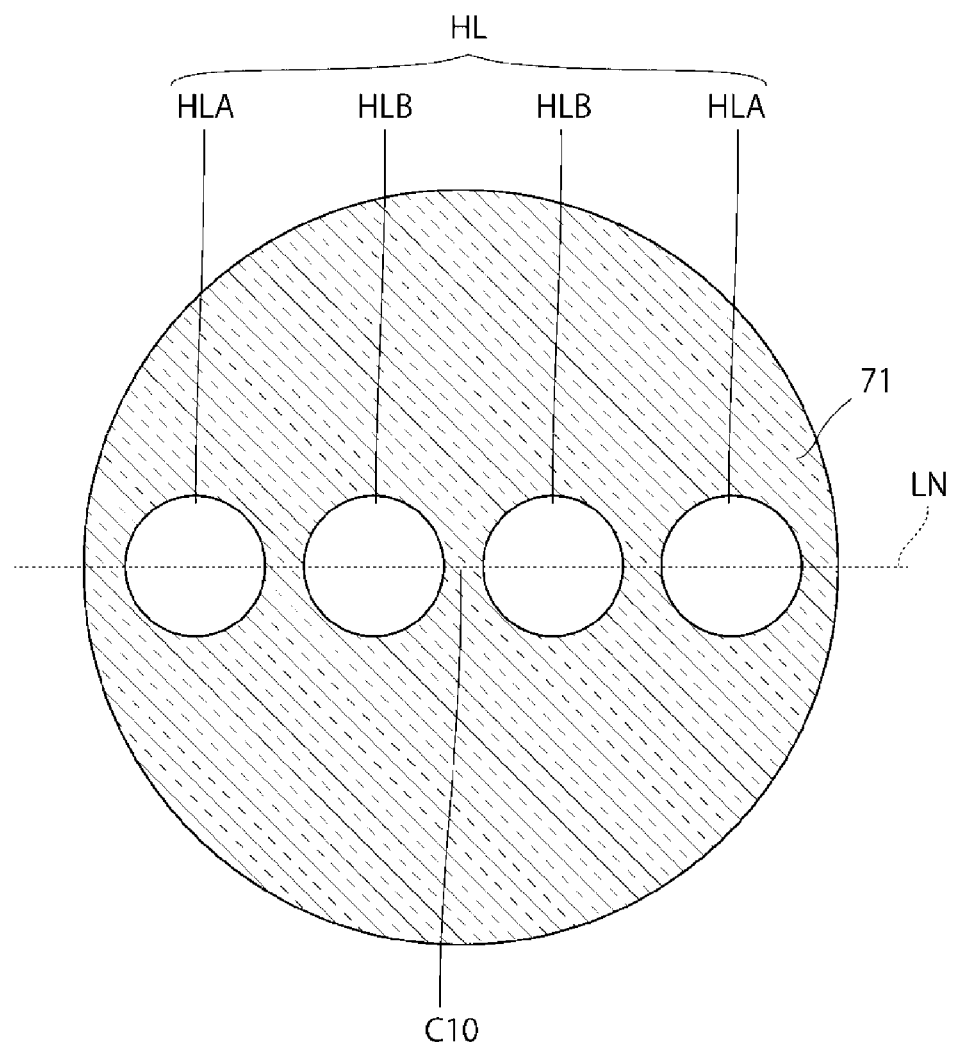
FIG. 9 is a diagram of the appearance after a boring process in the first manufacture method.

FIG. 9 is a diagram of the appearance after the boring process in the first manufacture method. As illustrated in FIG. 9, the boring process P1 is the process of boring a plurality of through holes HL in a cladding rod 71 in such a manner that the through holes along the longitudinal direction of the cladding rod 71 are arranged and disposed on a linear line LN passed through a center C10 of the cladding rod.

More specifically, the plurality of the through holes HL is bored along in the longitudinal direction of the cladding rod 71 using a drill, for example. The plurality of the through holes HL includes a pair of outer through holes HLA located at the outermost positions and inner through holes HLB sandwiched between the pair of the outer through holes HLA, and the outer through holes HLA and the inner through holes HLB are disposed along the diameter of the cladding rod 71. The cladding rod 71 is a cylindrical glass form, and formed of pure silica, for example.

It is noted that in FIG. 9, the centers of the through holes HL are located on the linear line passed through the center C10 of the cladding rod. However, it may be fine that the centers of the through holes HL are at positions displaced from the linear line LN passed through the center C10 of the cladding rod as long as the through holes HL are arranged and disposed on the linear line passed through the center C10 of the cladding rod.

<Inserting Process>

Figure 10:
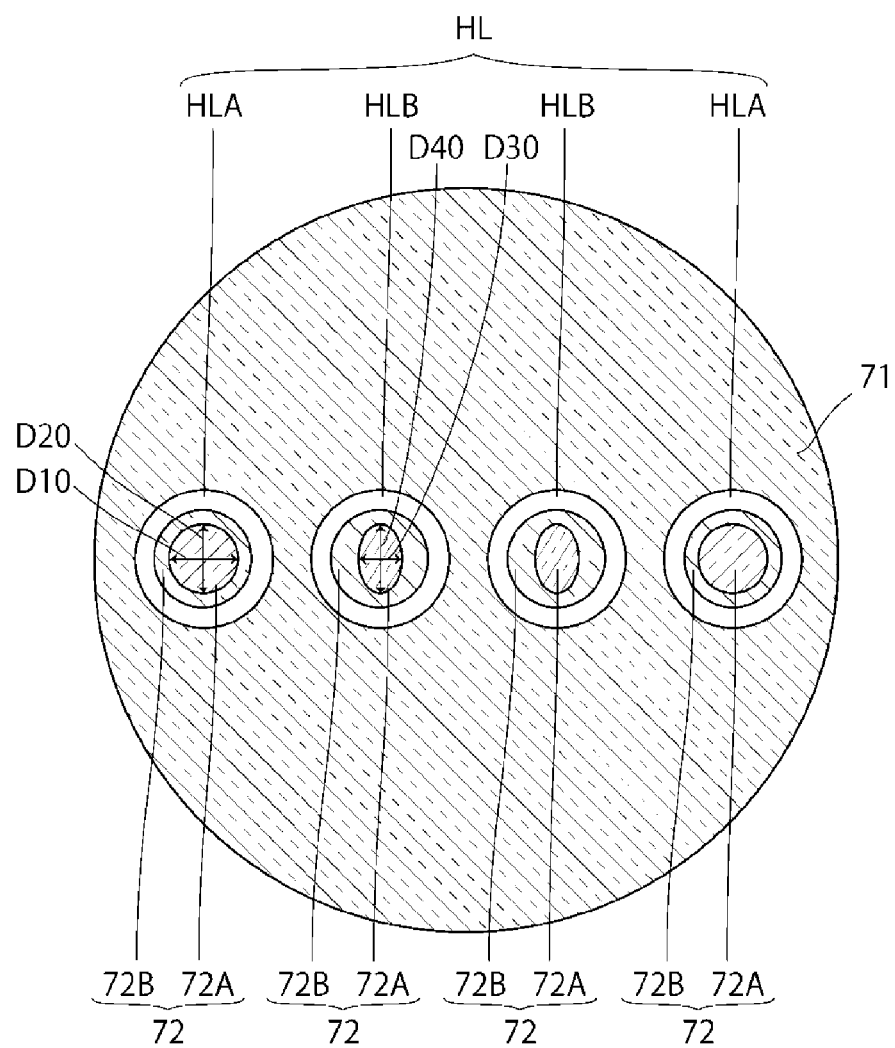
FIG. 10 is a diagram of the appearance after an inserting process in the first manufacture method.

FIG. 10 is a diagram of the appearance after the inserting process in the first manufacture method. As illustrated in FIG. 10, the inserting process P2 is the process of inserting a core enclosed rod 72 individually into the plurality of the through holes HL.

The core enclosed rod 72 is a member that is inserted into any of the through holes HL, and has a two-layer structure in which a core rod 72A is enclosed with a glass layer 72B. The average refractive index of the core rod 72A is set higher than the average refractive index of the glass layer 72B. For example, the core rod 72A is formed of silica doped with a dopant such as germanium, and the glass layer 72B is formed of pure silica. It is noted that the average refractive index of the glass layer 72B is almost the same as the average refractive index of the cladding rod 71.

In the plurality of the core enclosed rods 72 for use in the process, the cross section of the core enclosed rod 72 to be inserted into the outer through hole HLA has almost the same diameter, and the outer shape of the cross section is in a circular shape. On the other hand, the cross section of the core enclosed rod 72 to be inserted into the inner through hole HLB has the major axis greater than the minor axis, and the outer shape of the cross section is in an elliptic shape.

In other words, in the core rod 72A in the core enclosed rod 72 to be inserted into the outer through hole HLA, a diameter D10 in the first direction in which the plurality of the through holes HL is arranged is almost the same as a diameter D20 in the second direction orthogonal to the first direction. On the other hand, in the core rod 72A in the core enclosed rod 72 to be inserted into the inner through hole HLB, a diameter D30 in the first direction is made smaller than a diameter D40 in the second direction.

It is noted that in FIG. 10, the state is in which the center axis of the core enclosed rod 72 inserted into the through hole is matched with the center axes of the outer through hole HLA and the inner through hole HLB. However, it may be fine that the center axis of the core enclosed rod 72 is displaced from the center axes of the through holes HL as long as gaps are almost the same between the core enclosed rod 72 and the outer through hole HLA or the inner through hole HLB in the first direction in which the plurality of the through holes HL is arranged and in the second direction orthogonal to the first direction.

<Integrating Process>

Figure 11:
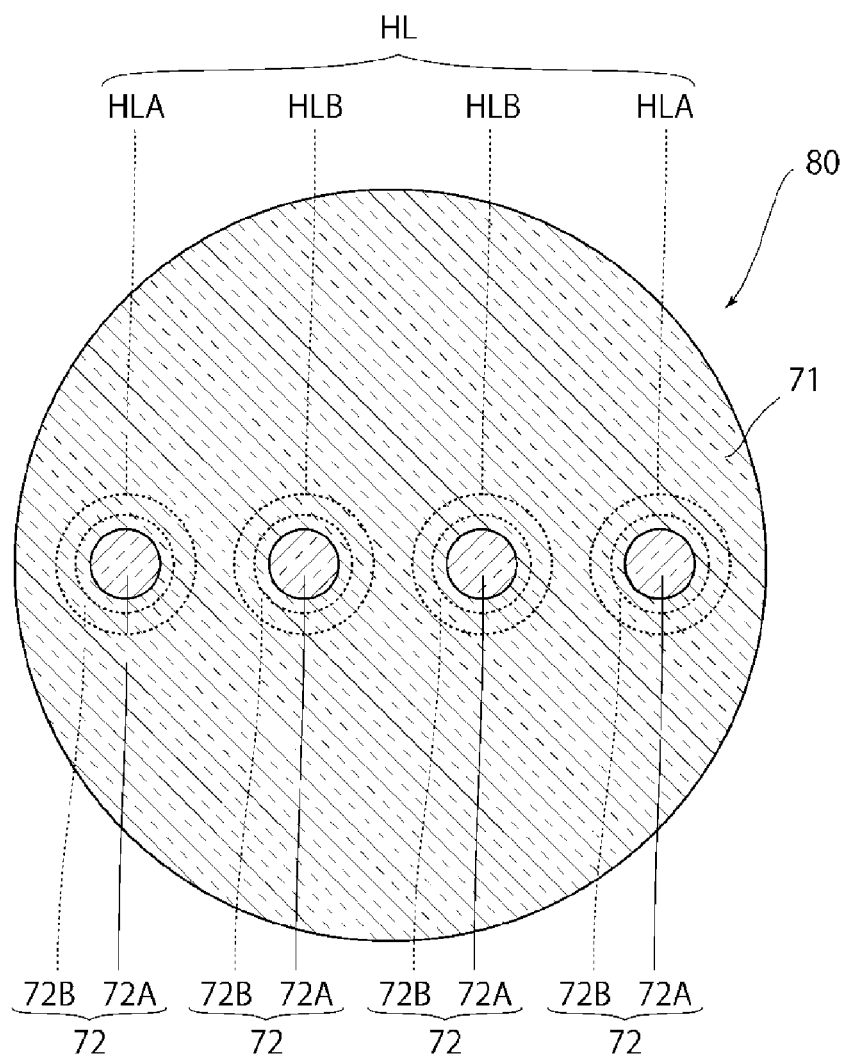
FIG. 11 is a diagram of the appearance after an integrating process in the first manufacture method.

FIG. 11 is a diagram of the appearance after the integrating process in the first manufacture method. As illustrated in FIG. 11, the integrating process P3 is the process of heating the cladding rod 71 and the core enclosed rod 72 and integrally forming the cladding rod 71 with the core enclosed rod 72.

More specifically, the cladding rod 71 and the core enclosed rod 72 inserted into the through hole HL of the cladding rod 71 are heated in a vacuum. In this case, the contraction or the like of the cladding rod 71 causes stress in the cladding rod 71 to fill the through hole HL, and the cladding rod 71 and the glass layer 72B, which is the outer layer of the core enclosed rod 72, are fusion-spliced and integrally formed. As a result, a multicore fiber base material 80 as illustrated in FIG. 11 is obtained.

Meanwhile, in the inside of the cladding rod 71, the amount of the space per unit volume in the first direction in which the plurality of the through holes HL is arranged is greater than the amount of the space per unit volume in the second direction orthogonal to the first direction. Therefore, a greater stress is applied to the through hole HL in the second direction than in the first direction, and a greater stress is applied to the inner through hole HLB than to the outer through hole HLA.

Therefore, the inner through hole HLB to which a greater stress is applied in the second direction than in the first direction is deformed in such a manner that the core rod 72A of the core enclosed rod 72 is flattened in the second direction one hand, and the core rod 72A extends in the first direction, on the other hand.

In contrast to this, in the outer through hole HLA to which stress is less applied than to the inner through hole HLB, the core rod 72A of the core enclosed rod 72 is not generally deformed.

Accordingly, the outer shape of the core rod 72A of the core enclosed rod 72 to be inserted into the inner through hole HLB is deformed in such a manner that the outer shape comes close to the outer shape of the core rod 72A of the core enclosed rod 72 to be inserted into the outer through hole HLA.

<Drawing Process>

The drawing process P4 is the process of drawing the rod (the multicore fiber base material 80) integrally formed in the integrating process P3.

More specifically, an end working process is applied as pre-processing in which one end of the multicore fiber base material 80 obtained in the integrating process P3 is formed in a cone-shaped projection. It is noted that the end working process may be applied in the integrating process P3.

The multicore fiber base material 80 is then placed on a spinning furnace, and the multicore fiber base material 80 is heated in the spinning furnace until the projection of the multicore fiber base material 80 is molten. The projection of the multicore fiber base material 80 in the molten state is drawn, and the drawn portion is cooled to an appropriate temperature using a cooling device.

As a result, the core rod 72A in the drawn portion is formed as the core 11, and the glass layer 72B and the cladding rod 71, which are fusion-spliced with each other in the portion, are formed as the cladding 12.

<Protective Layer Forming Process>

The protective layer forming process P5 is the process of forming a protective layer around the cladding 12. More specifically, the outer circumferential surface of the cladding 12 is enclosed with an ultraviolet curable resin, for example, and ultraviolet rays are applied to the ultraviolet curable resin to form the first protective layer 13.

After that, the outer circumferential surface of the first protective layer 13 is enclosed with an ultraviolet curable resin, for example, and ultraviolet rays are applied to the ultraviolet curable resin to form the second protective layer 14. Thus, the multicore fiber 1 illustrated in FIG. 1 is manufactured.

<Operation and Effect>

In the first manufacture method described above, the core rod 72A of the core enclosed rod 72 to be inserted into the inner through hole HLB in the inserting process P2 has the diameter D30 in the first direction smaller than the diameter D40 in the second direction.

Therefore, as described above, the core enclosed rod 72 in the inner through hole HLB is deformed in such a manner that the core rod 72A is flattened in the second direction on one hand, and the core rod 72A extends in the first direction on the other hand. In contrast to this, in the core enclosed rod 72 in the outer through hole HLA to which stress is less applied than to the inner through hole HLB, the core rod 72A is not generally deformed.

Therefore, it is possible by the first manufacture method that the outer shape of the core rod 72A in the core enclosed rod 72 to be inserted into the inner through hole HLB is deformed in such a manner that the outer shape comes close to the outer shape of the core rod 72A in the core enclosed rod 72 to be inserted into the outer through hole HLA.

As described above, according to the first manufacture method, the multicore fiber 1 can be obtained in which the shapes of the cores 11 are almost the same, so that it is possible to suppress fluctuations in the cutoff wavelengths of the cores adjacent to each other 11, and it is possible to increase a communication waveband in which light can be propagated in the single mode. Accordingly, the first manufacture method for the multicore fiber 1 that can increase the options of selecting a communication waveband is implemented.

<Applications for the Other Embodiments>

Meanwhile, in the case where the multicore fiber 2 according to the second embodiment is manufactured using the first manufacture method, the inserting process P2 is modified. In other words, the core enclosed rod 72 inserted into the through hole HL is changed to a core enclosed rod 82 illustrated in FIG. 12.

Figure 12:
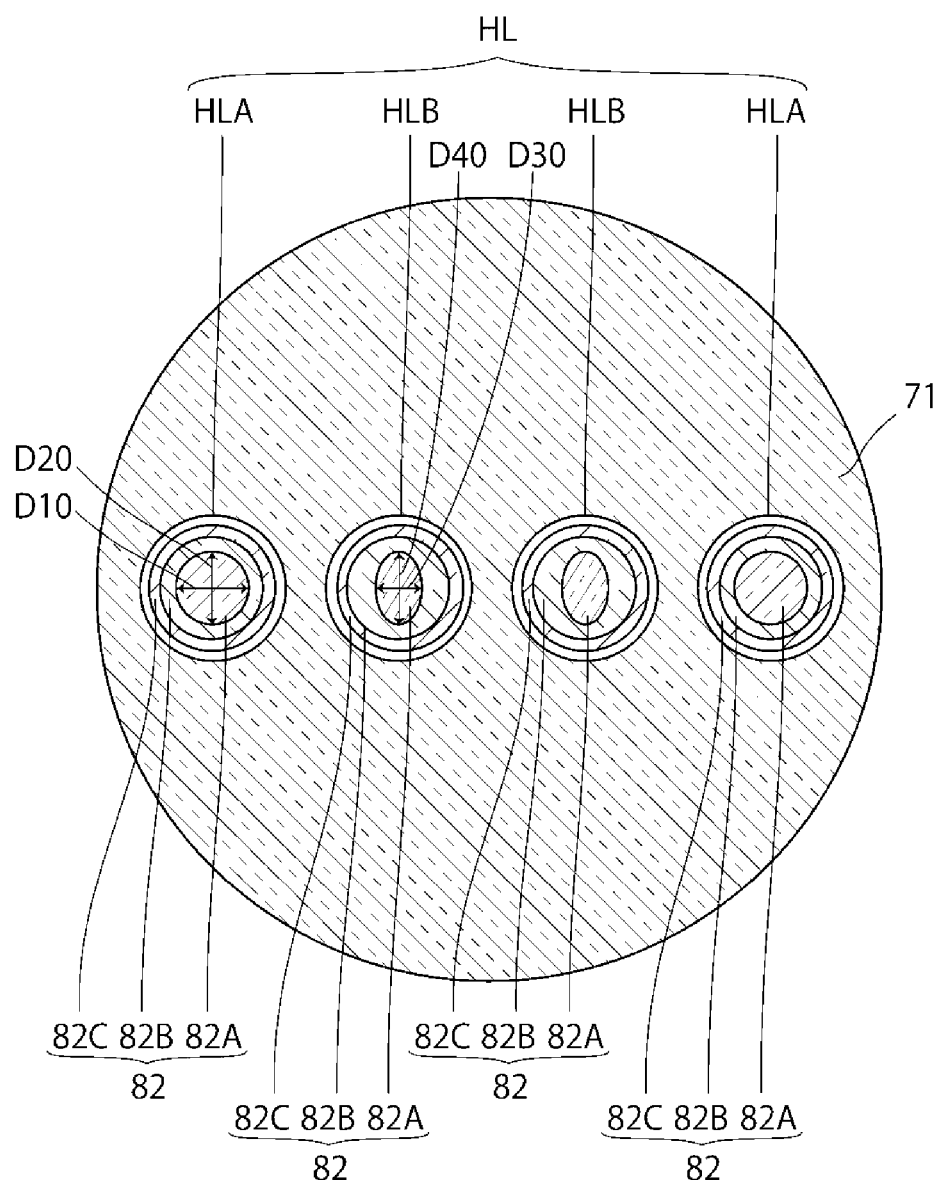
FIG. 12 is a diagram of the appearance after the inserting process in the case where the multicore fiber according to the second embodiment is manufactured using the first manufacture method.

FIG. 12 is a diagram of the appearance after the inserting process in the case where the multicore fiber 2 according to the second embodiment is manufactured using the first manufacture method. As illustrated in FIG. 12, the core enclosed rod 82 has a three-layer structure including a core rod 82A, a first glass layer 82B that encloses the core rod 82A, and a second glass layer 82C that encloses the first glass layer 82B.

The average refractive index of the first glass layer 82B is set lower than the average refractive index of the core rod 82A, and the average refractive index of the second glass layer 82C is set lower than the average refractive index of the first glass layer 82B and higher than the average refractive index of the cladding rod 71.

For example, the core rod 82A is formed of silica doped with a dopant that increases the average refractive index such as germanium, the first glass layer 82B and the cladding rod 71 are formed of pure silica, and the second glass layer 82C is formed of silica doped with a dopant that reduces the average refractive index such as fluorine. It is noted that the amount of a dopant, for example, can be adjusted according to the amount of stress applied to the core enclosed rod 82 in the integrating process P3.

Moreover, in the core rod 82A of the core enclosed rod 82 to be inserted into the outer through hole HLA, the diameter D10 in the first direction in which the plurality of the through holes HL is arranged is almost the same as the diameter D20 in the second direction orthogonal to the first direction. On the other hand, in the core rod 82A in the core enclosed rod 82 to be inserted into the inner through hole HLB, the diameter D30 in the first direction is made smaller than the diameter D40 in the second direction.

The core enclosed rod 82 is inserted into the outer through hole HLA and the inner through hole HLB, and then the cladding rod 71 is in turn subjected to the integrating process P3 and the drawing process P4. Thus, the core rod 82A of the core enclosed rod 82 is formed as the core 11, the first glass layer 82B is formed as the inner cladding layer 21, and the second glass layer 82C is formed as the trench layer 22. Moreover, the cladding rod 71 is formed as the cladding 12.

After that, the multicore fiber 2 illustrated in FIG. 2 is manufactured through the protective layer forming process P5.

It is noted that in FIG. 12, the state is in which the center axis of the core enclosed rod 82 inserted into the through hole HL is matched with the center axes of the outer through hole HLA and the inner through hole HLB. However, it may be fine that the center axis of the core enclosed rod 82 is displaced from the center axes of the through holes HL as long as gaps are almost the same between the core enclosed rod 82 and the outer through hole HLA or the inner through hole HLB in the first direction in which the plurality of the through holes HL is arranged and in the second direction orthogonal to the first direction.

Moreover, in the case where the multicore fiber 3 according to the third embodiment is manufactured using the first manufacture method, the inserting process P2 is modified. In other words, the core enclosed rod 72 inserted into the through hole HL is changed to a core enclosed rod 92 illustrated in FIG. 13.

Figure 13:
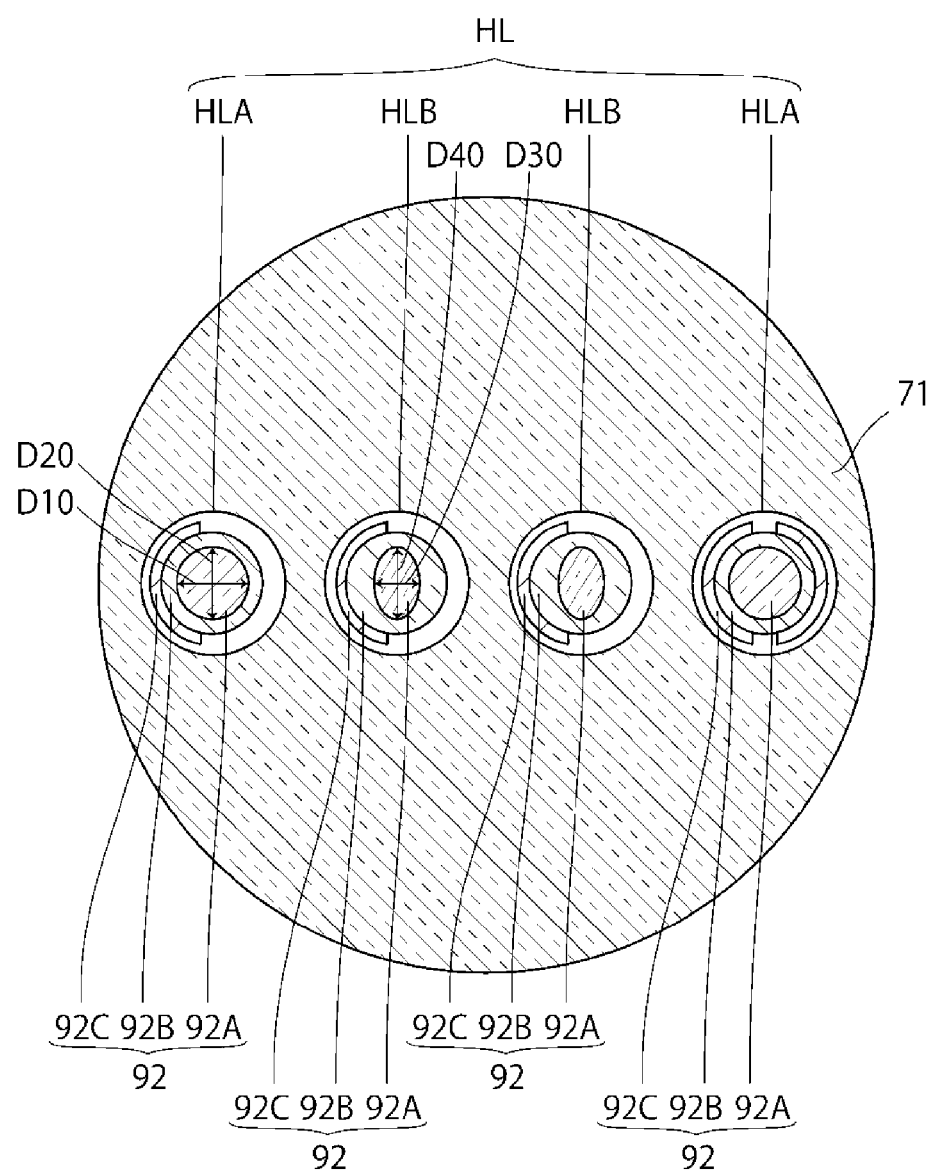
FIG. 13 is a diagram of the appearance after the inserting process in the case where the multicore fiber according to the third embodiment is manufactured using the first manufacture method.

FIG. 13 is a diagram of the appearance after the inserting process in the case where the multicore fiber 3 according to the third embodiment is manufactured using the first manufacture method. As illustrated in FIG. 13, the core enclosed rod 92 has a three-layer structure including a core rod 92A, a first glass layer 92B that encloses the core rod 92A, and a second glass layer 92C provided on a part of the outer circumferential surface of the first glass layer 92B.

The second glass layer 92C is in the state in which a glass tube is cut into almost a half along the longitudinal direction. In one of a pair of the outer through holes HLA and the inner through hole HLB, the second glass layer 92C is provided on one of the outer circumferential surfaces of the first glass layers 92B opposite to each other in the first direction in which a plurality of the through holes HL is arranged.

Moreover, in the other of the pair of the outer through holes HLA, the second glass layer 92C is provided on both of the outer circumferential surfaces of the first glass layers 92B opposite to each other in the first direction in which the plurality of the through holes HL is arranged.

It is noted that the outer shape of the core rod 92A of the core enclosed rod 92 to be inserted into the outer through hole HLA is in a circular shape similarly to the core enclosed rod 92, and the outer shape of the core rod 92A of the core enclosed rod 92 to be inserted into the inner through hole HLB is in an elliptic shape similarly to the core enclosed rod 92.

The core enclosed rod 92 is inserted into the outer through hole HLA and the inner through hole HLB, and then the cladding rod 71 is in turn subjected to the integrating process P3 and the drawing process P4. Thus, the core rod 92A of the core enclosed rod 92 is formed as the core 11, the first glass layer 82B and the cladding rod 71 are formed as the cladding 12, and the second glass layer 92C is formed as the barrier layer 31.

After that, the multicore fiber 3 illustrated in FIG. 3 is manufactured through the protective layer forming process P5.

It is noted that in FIG. 13, the state is in which the center axis of the core enclosed rod 92 inserted into the through hole is matched with the center axes of the outer through hole HLA and the inner through hole HLB. However, it may be fine that the center axis of the core enclosed rod 92 is displaced from the center axes of the through holes HL as long as gaps are almost the same between the core enclosed rod 92 and the outer through hole HLA or the inner through hole HLB in the first direction in which the plurality of the through holes HL is arranged and in the second direction orthogonal to the first direction.

Moreover, in the case where the multicore fiber 4 according to the fourth embodiment is manufactured using the first manufacture method, a hole forming process is additionally provided between the integrating process P3 and the drawing process P4.

Figure 14:
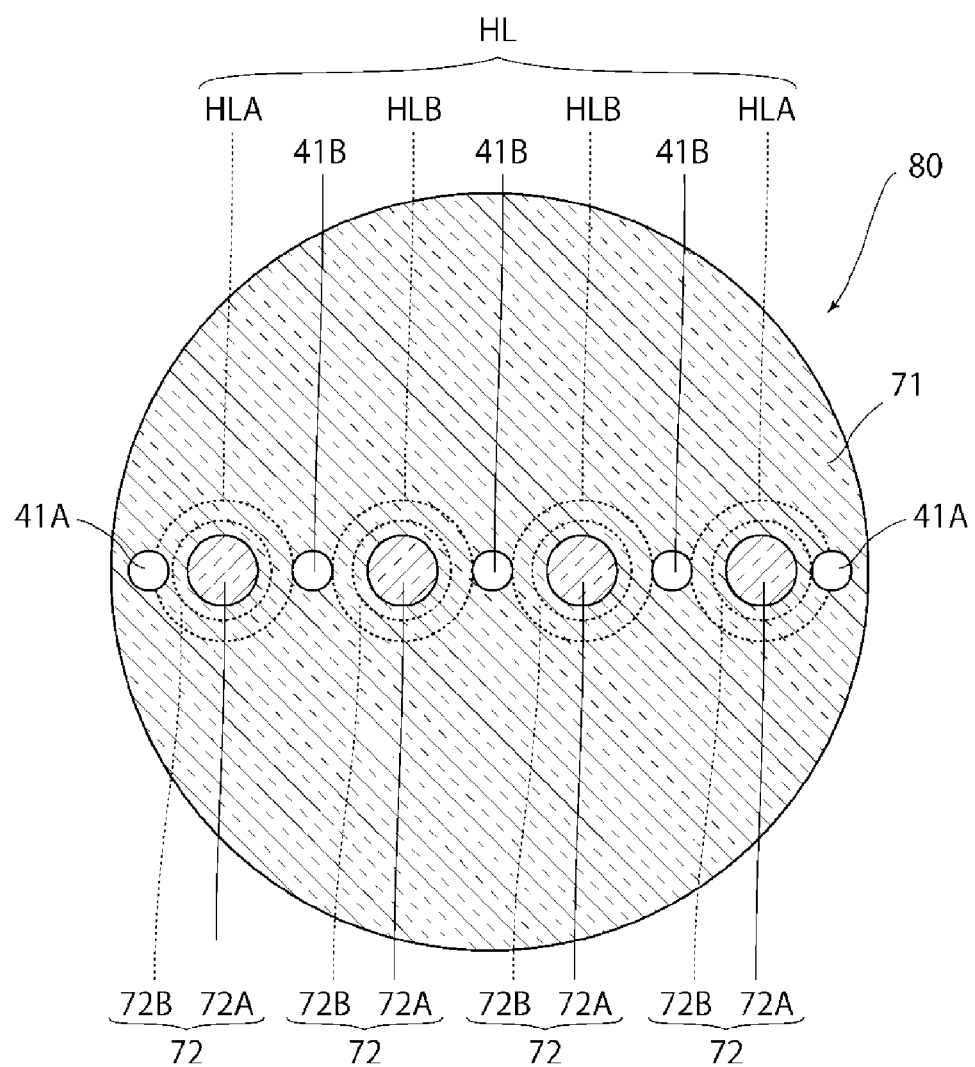
FIG. 14 is a diagram of the appearance after a hole forming process in the case where the multicore fiber according to the fourth embodiment is manufactured using the first manufacture method.

FIG. 14 is a diagram of the appearance after the hole forming process in the case where the multicore fiber 4 according to the fourth embodiment is manufactured using the first manufacture method. As illustrated in FIG. 14, in the hole forming process, the first hole 41A and the second hole 41B are formed at the center position, for example, between the core rods 72A adjacent to each other of the multicore fiber base material 80.

Subsequently, in the drawing process P4, the multicore fiber base material 80 is drawn in the state in which a pressure is applied to the inner surfaces of the first hole 41A and the second hole 41B. As a result, the first hole 41A and the second hole 41B are left in the drawn portion, and the core rod 72A in the drawn portion is formed as the core 11. Moreover, the glass layer 72B and the cladding rod 71 fusion-spliced to each other in the drawn portion are formed as the cladding 12.

After that, the multicore fiber 4 illustrated in FIG. 4 is manufactured through the protective layer forming process P5.

Furthermore, in the case where the multicore fiber 5 according to the fifth embodiment is manufactured using the first manufacture method, the hole forming process is additionally provided between the integrating process P3 and the drawing process P4.

Figure 15:
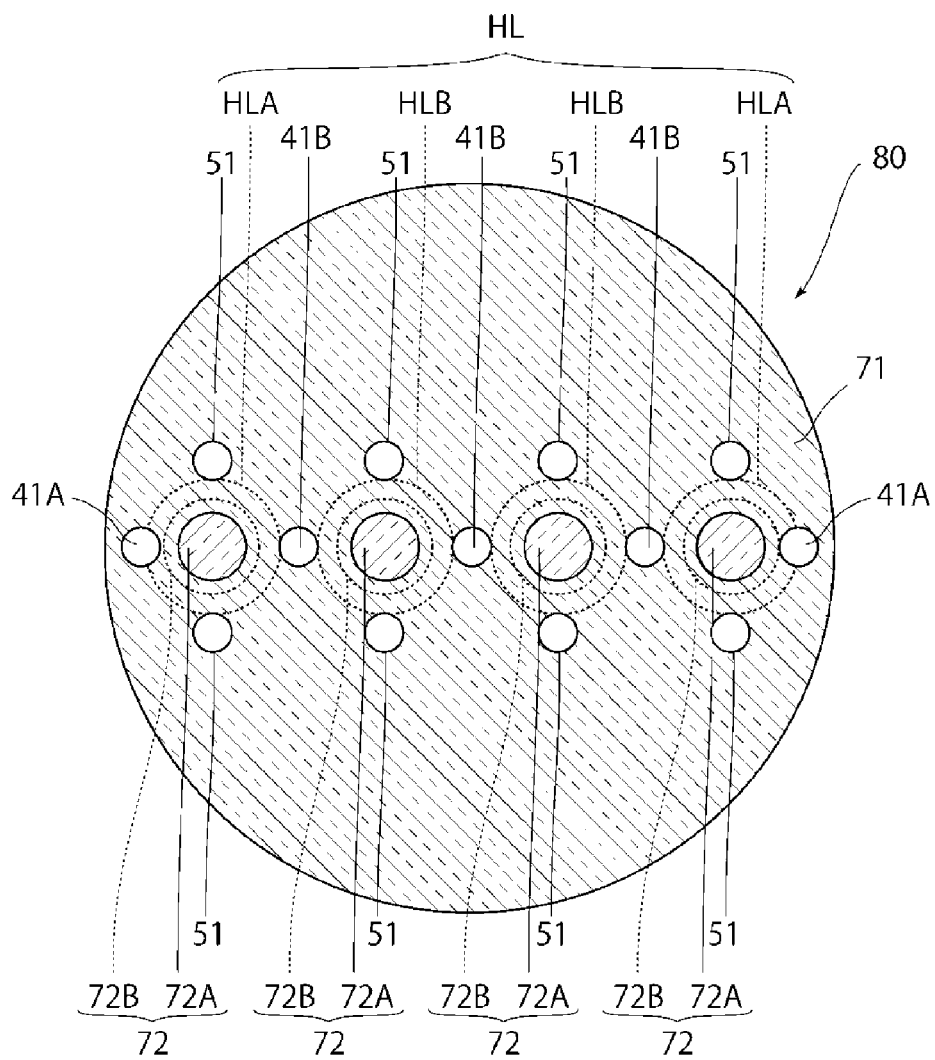
FIG. 15 is a diagram of the appearance after the hole forming process in the case where the multicore fiber according to the fifth embodiment is manufactured using the first manufacture method.

FIG. 15 is a diagram of the appearance after the hole forming process in the case where the multicore fiber 5 according to the fifth embodiment is manufactured using the first manufacture method. As illustrated in FIG. 15, in the hole forming process, the first hole 41A and the second hole 41B are formed at the center position, for example, between the core rods 72A adjacent to each other of the multicore fiber base material 80.

Moreover, a pair of the holes 51 is formed in the second direction orthogonal to the first direction in which the plurality of the through holes HL is arranged as the core rod 72A is sandwiched in such a manner that the distance is almost the same as the distance from the core rod 72A to the first hole 41A, for example.

Subsequently, in the drawing process P4, the multicore fiber base material 80 is drawn in the state in which a pressure is applied to the inner surfaces of the first hole 41A, the second hole 41B, and the hole 51. As a result, the first hole 41A, the second hole 41B, and the hole 51 are left in the drawn portion, and the core rod 72A in the drawn portion is formed as the core 11. Moreover, the glass layer 72B and the cladding rod 71 fusion-spliced to each other in the drawn portion are formed as the cladding 12.

After that, the multicore fiber 5 illustrated in FIG. 5 is manufactured through the protective layer forming process P5.

2-2. Second Manufacture Method for the Multicore Fiber

Next, a second manufacture method for the multicore fiber will be described in detail with reference to the drawings. However, for convenience of explanation, the case will be described where the multicore fiber 1 according to the first embodiment is manufactured using the second manufacture method. Moreover, components the same as or equivalent to the components of the first manufacture method for the multicore fiber are designated the same reference numerals and signs, and the overlapping description will be appropriately omitted.

As similar to the first manufacture method for the multicore fiber, the second manufacture method for the multicore fiber includes a boring process P1, an inserting process P2, an integrating process P3, a drawing process P4, and a protective layer forming process P5 as main processes.

In the second manufacture method, in the processes P1 to P5, the content of the inserting process P2 is different from the first manufacture method for the multicore fiber, and the inserting process P2 will be mainly described.

Figure 16:
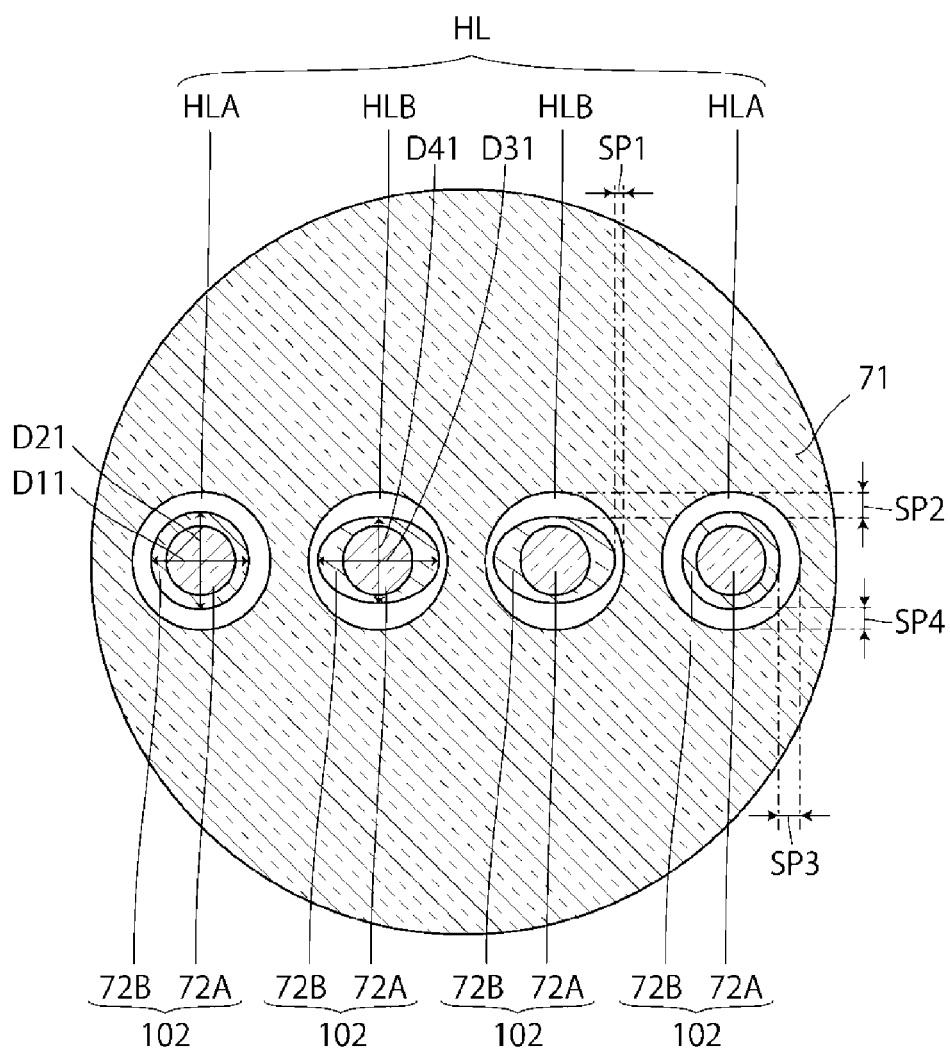
FIG. 16 is a diagram of the appearance after an inserting process in a second manufacture method for a multicore fiber.

FIG. 16 is a diagram of the appearance after the inserting process in the second manufacture method for the multicore fiber 1. As illustrated in FIG. 16, in the inserting process P2, a core enclosed rod 102 is inserted into the through hole HL instead of the core enclosed rod 72 used in the first manufacture method.

The core enclosed rod 102 has a two-layer structure including a core rod 72A and a glass layer 72B that encloses the core rod 72A similarly to the core enclosed rod 72.

In a plurality of the core enclosed rods 102 for use in the process, the cross section of the core enclosed rod 102 to be inserted into the outer through holes HLA has almost the same diameter, and the outer shape of the cross section is in a circular shape. On the other hand, the cross section of the core enclosed rod 102 to be inserted into the inner through hole HLB has the major axis greater than the minor axis, and the outer shape of the cross section is in an elliptic shape.

In other words, in the core enclosed rod 102 to be inserted into the outer through hole HLA, a diameter D11 in the first direction in which the plurality of the through holes HL is arranged is almost the same as a diameter D21 in the second direction orthogonal to the first direction. On the other hand, in the core enclosed rod 102 to be inserted into the inner through hole HLB, a diameter D41 in the second direction is made smaller than a diameter D31 in the first direction.

Therefore, a first space SP1 between the inner through hole HLB and the core enclosed rod 102 in the first direction is smaller than a second space SP2 between the inner through hole HLB and the core enclosed rod 102 in the second direction.

Moreover, a third space SP3 between the outer through hole HLA and the core enclosed rod 102 in the first direction is almost the same as a fourth space SP4 between the outer through hole HLA and the core enclosed rod 102 in the second direction.

In other words, the state is in which the difference between the first space SP1 and the second space SP2 is greater than the difference between the third space SP3 and the fourth space SP4.

It is noted that the cross section of the core rod 72A of the core enclosed rod 102 to be inserted into the outer through hole HLA and the inner through hole HLB has almost the same diameter, and the outer shape of the cross section is in a circular shape.

The core enclosed rod 102 is inserted into the outer through hole HLA and the inner through hole HLB, and then the cladding rod 71 is in turn subjected to the integrating process P3 and the drawing process P4. Thus, the core rod 72A of the core enclosed rod 102 is formed as the core 11, and the glass layer 72B and the cladding rod 71 are formed as the cladding 12.

After that, the multicore fiber 1 illustrated in FIG. 1 is manufactured through the protective layer forming process P5.

<Operation and Effect>

As described above, in the second manufacture method, the first space SP1 between the inner through hole HLB and the core enclosed rod 102 in the first direction is smaller than the second space SP2 between the inner through hole HLB and the core enclosed rod 102 in the second direction.

Therefore, even though a larger stress is applied to the inner through hole HLB in the first direction than in the second direction in the integrating process P3, the amount of stress per unit time applied to the core enclosed rod 102 in the inner through hole HLB is almost the same in the first direction and in the second direction.

Moreover, in the second manufacture method, the difference between the first space SP1 and the second space SP2 in the inner through hole HLB is greater than the difference between the third space SP3 and the fourth space SP4 in the outer through hole HLA.

Therefore, even though the stress applied to the inner through hole HLB is greater than the stress applied to the outer through hole HLA in the integrating process P3, the amount of stress per unit time applied to the core enclosed rod 102 in the through hole HL is almost the same between the core enclosed rods.

Accordingly, in the second manufacture method, even though the stress applied to the through holes HL is varied, it is possible to deform the core enclosed rod 102 in the inner through hole HLB almost the same as the outer shape of the core enclosed rod 102 in the outer through hole HLA.

As described above, according to the second manufacture method, the multicore fiber 1 can be obtained in which the shapes of the cores 11 are almost the same similarly to the first manufacture method, so that it is possible to increase a communication waveband in which light can be propagated in the single mode. Thus, the method of manufacture of the multicore fiber 1 that can increase the options of selecting a communication waveband is implemented.

<Applications for the Other Embodiments>

Meanwhile, in the case where the multicore fiber 2 according to the second embodiment is manufactured using the second manufacture method, the inserting process P2 is modified. In other words, the core enclosed rod 102 inserted into the through hole HL is changed to a core enclosed rod 112 illustrated in FIG. 17.

Figure 17:
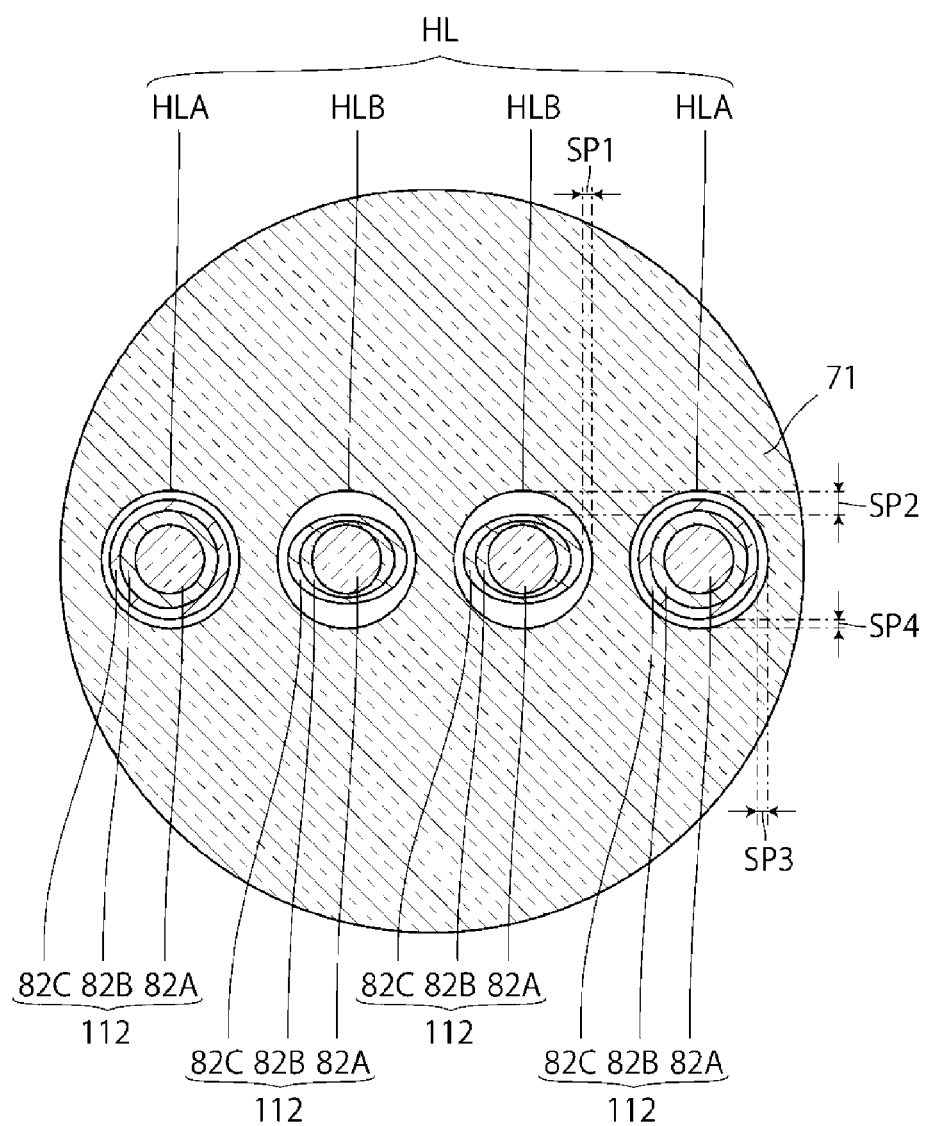
FIG. 17 is a diagram of the appearance after the inserting process in the case where the multicore fiber according to the second embodiment is manufactured using the second manufacture method.

FIG. 17 is a diagram of the appearance after the inserting process in the case where the multicore fiber 2 according to the second embodiment is manufactured using the second manufacture method. As illustrated in FIG. 17, similarly to the core enclosed rod 82, the core enclosed rod 112 has a three-layer structure including a core rod 82A, a first glass layer 82B, and a second glass layer 82C.

Moreover, in a plurality of the core enclosed rods 112, the cross section of the core enclosed rod 112 to be inserted into the outer through hole HLA has almost the same diameter, and the outer shape of the cross section is in a circular shape. On the other hand, the cross section of the core enclosed rod 112 to be inserted into the inner through hole HLB has the major axis greater than the minor axis, and the outer shape of the cross section is in an elliptic shape.

In other words, the first space SP1 is smaller than the second space SP2, and the difference between the first space SP1 and the second space SP2 is greater than the difference between the third space SP3 and the fourth space SP4.

The core enclosed rod 112 is inserted into the outer through hole HLA and the inner through hole HLB, and then the cladding rod 71 is in turn subjected to the integrating process P3 and the drawing process P4. Thus, the core rod 82A of the core enclosed rod 112 is formed as the core 11, the first glass layer 82B is formed as the inner cladding layer 21, and the second glass layer 82C is formed as the trench layer 22. Moreover, the cladding rod 71 is formed as the cladding 12.

After that, the multicore fiber 2 illustrated in FIG. 2 is manufactured through the protective layer forming process P5.

It is noted that in FIG. 17, the state is in which the center axis of the core enclosed rod 112 inserted into the through hole is matched with the center axes of the outer through hole HLA and the inner through hole HLB. However, it may be fine that the center axis of the core enclosed rod 112 is displaced from the center axes of the through holes HL as long as gaps are almost the same between the core enclosed rod 112 and the outer through hole HLA or the inner through hole HLB in the first direction in which the plurality of the through holes HL is arranged and in the second direction orthogonal to the first direction.

Moreover, in the case where the multicore fiber 3 according to the third embodiment is manufactured using the second manufacture method, the inserting process P2 is modified. In other words, the core enclosed rod 72 inserted into the through hole HL is changed to a core enclosed rod 122 illustrated in FIG. 18.

Figure 18:
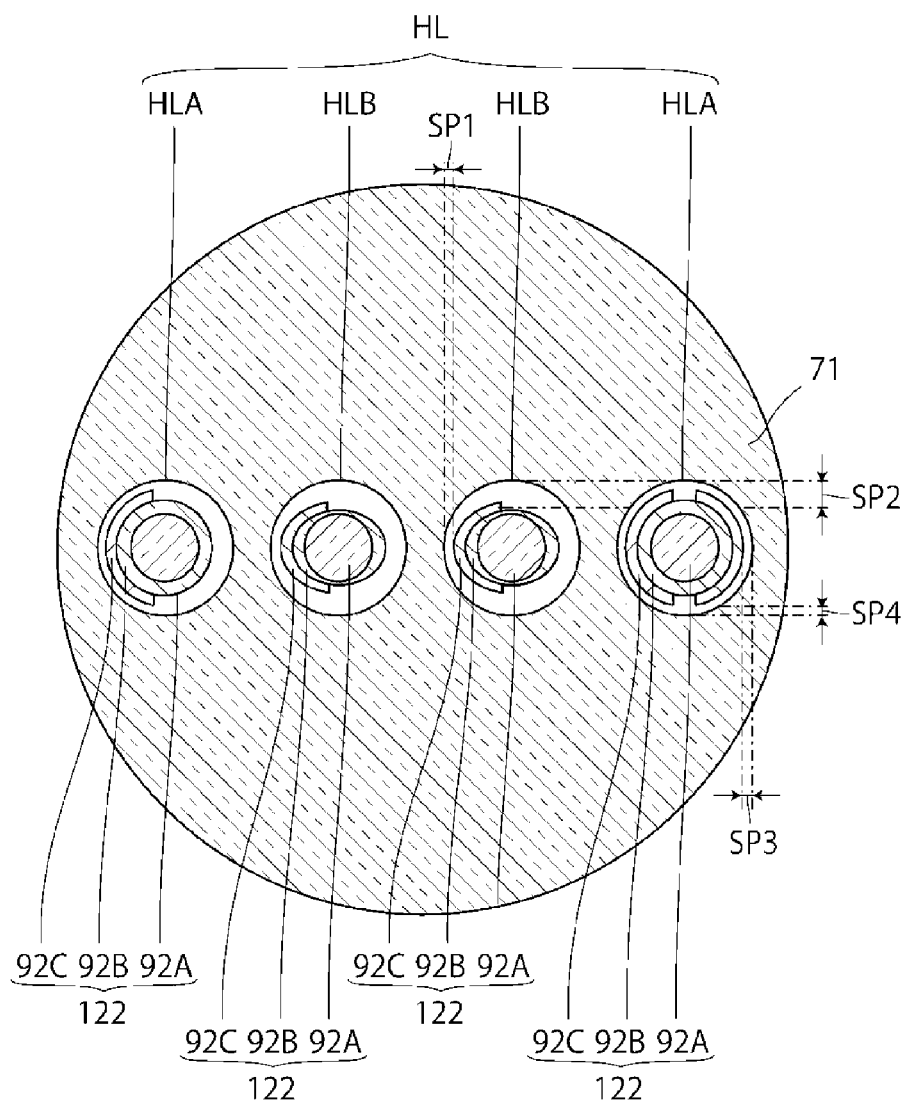
FIG. 18 is a diagram of the appearance after the inserting process in the case where the multicore fiber according to the third embodiment is manufactured using the second manufacture method.

FIG. 18 is a diagram of the appearance after the inserting process in the case where the multicore fiber 3 according to the third embodiment is manufactured using the second manufacture method. As illustrated in FIG. 18, similarly to the core enclosed rod 92, the core enclosed rod 122 has a three-layer structure including a core rod 92A, a first glass layer 92B that encloses the core rod 92A, and a second glass layer 92C provided on a part of the outer circumferential surface of the first glass layer 92B.

In a plurality of the core enclosed rods 122, the cross section of the core enclosed rod 122 to be inserted into the outer through hole HLA has almost the same diameter, and the outer shape of the cross section is in a circular shape. On the other hand, the cross section of the core enclosed rod 122 to be inserted into the inner through hole HLB has the major axis greater than the minor axis, and the outer shape of the cross section is in an elliptic shape. In other words, the first space SP1 is smaller than the second space SP2, and the difference between the first space SP1 and the second space SP2 is greater than the difference between the third space SP3 and the fourth space SP4.

The core enclosed rod 122 is inserted into the outer through hole HLA and the inner through hole HLB, and then the cladding rod 71 is in turn subjected to the integrating process P3 and the drawing process P4. Thus, the core rod 92A of the core enclosed rod 122 is formed as the core 11, the first glass layer 92B and the cladding rod 71 are formed as the cladding 12, and the second glass layer 92C is formed as the barrier layer 31.

After that, the multicore fiber 3 illustrated in FIG. 3 is manufactured through the protective layer forming process P5.

It is noted that in FIG. 18, the state is in which the center axis of the core enclosed rod 122 inserted into the through hole is matched with the center axes of the outer through hole HLA and the inner through hole HLB. However, it may be fine that the center axis of the core enclosed rod 122 is displaced from the center axes of the through holes HL as long as gaps are almost the same between the core enclosed rod 122 and the outer through hole HLA or the inner through hole HLB in the first direction in which the plurality of the through holes HL is arranged and in the second direction orthogonal to the first direction.

Moreover, in the case where the multicore fiber 4 according to the fourth embodiment is manufactured and in the case where the multicore fiber 5 according to the fifth embodiment is manufactured using the second manufacture method, the hole forming process is additionally provided between the integrating process P3 and the drawing process P4.

The content in the hole forming process is the same as the case where the multicore fiber 4 or 5 is manufactured using the first manufacture method, and the content is omitted here.

2-3. Third Manufacture Method for the Multicore Fiber

Next, a third manufacture method for the multicore fiber will be described in detail with reference to the drawings. However, for convenience of explanation, the case will be described where the multicore fiber 1 according to the first embodiment is manufactured using the third manufacture method. Moreover, components the same as or equivalent to the components of the methods of manufacture of the multicore fiber are designated the same reference numerals and signs, and the overlapping description will be appropriately omitted.

As similar to the first manufacture method for the multicore fiber, the third manufacture method for the multicore fiber includes a boring process P1, an inserting process P2, an integrating process P3, a drawing process P4, and a protective layer forming process P5 as main processes.

In the third manufacture method, in the processes P1 to P5, the content of the inserting process P2 is different from the first manufacture method for the multicore fiber, and the inserting process P2 will be mainly described.

Figure 19:
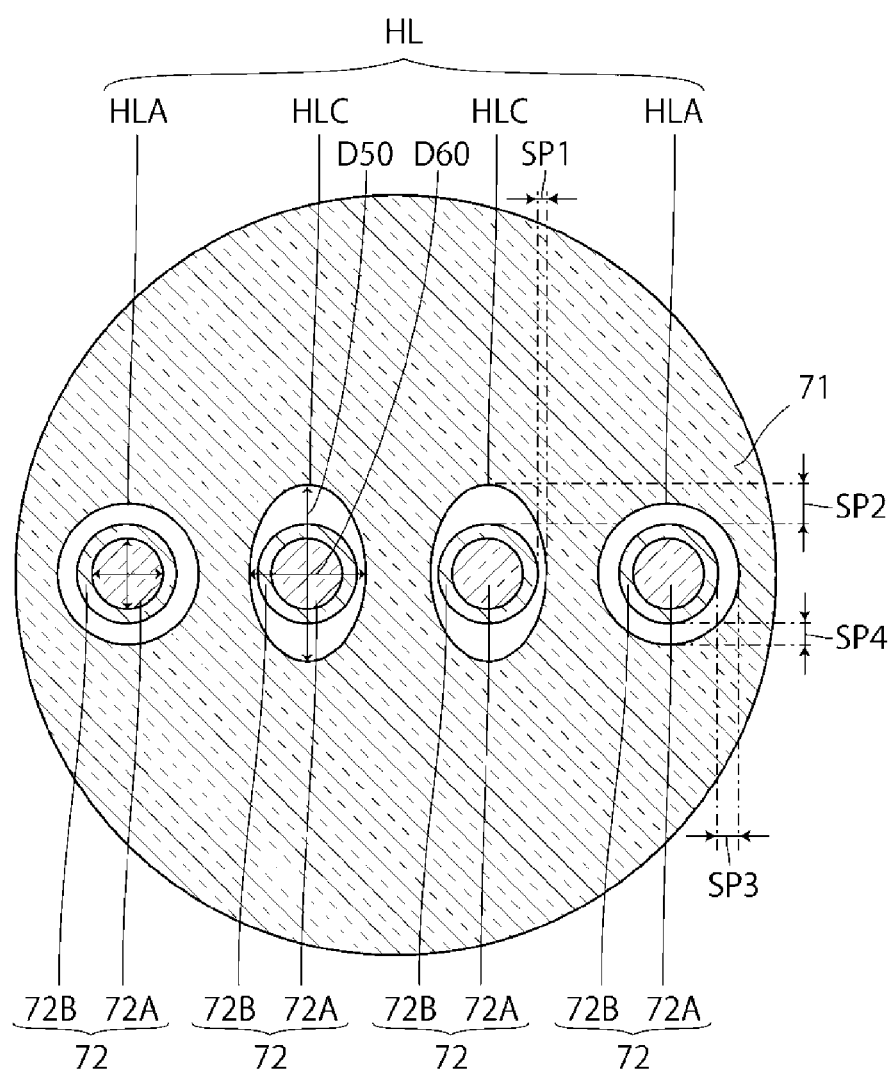
FIG. 19 is a diagram of the appearance after an inserting process in a third manufacture method for the multicore fiber.

FIG. 19 is a diagram of the appearance after the inserting process in the third manufacture method for the multicore fiber 1. As illustrated in FIG. 19, in the inserting process P2, an inner through hole HLC is bored in the cladding rod 71 instead of the inner through hole HLB in the first manufacture method.

The inner through hole HLC has a diameter D60 in the first direction smaller than a diameter D50 in the second direction orthogonal to the first direction in which a plurality of the through holes HL is arranged. It is noted that the inner through hole HLC is formed in which a hole in a circular shape in the cross section is bored using a drill, and then polished in the second direction.

Therefore, the first space SP1 between the inner through hole HLC and the core enclosed rod 72 in the first direction is smaller than the second space SP2 between the inner through hole HLC and the core enclosed rod 72 in the second direction.

Moreover, the third space SP3 between the outer through hole HLA and the core enclosed rod 72 in the first direction is almost the same as the fourth space SP4 between the outer through hole HLA and the core enclosed rod 72 in the second direction.

In other words, the state is in which the difference between the first space SP1 and the second space SP2 is greater than the difference between the third space SP3 and the fourth space SP4.

It is noted that the cross section of the core rod 72A of the core enclosed rod 72 to be inserted into the outer through hole HLA and the inner through hole HLC has almost the same diameter, and the outer shape of the cross section is in a circular shape.

The core enclosed rod 72 is inserted into the outer through hole HLA and the inner through hole HLC, and then the cladding rod 71 is in turn subjected to the integrating process P3 and the drawing process P4. Thus, the core rod 72A of the core enclosed rod 72 is formed as the core 11, and the glass layer 72B and the cladding rod 71 are formed as the cladding 12.

After that, the multicore fiber 1 illustrated in FIG. 1 is manufactured through the protective layer forming process P5.

<Operation and Effect>

As described above, in the third manufacture method, the outer shapes of the inner through hole HLC and the cross section of the core enclosed rod 72 are inverted to the case of the second manufacture method. In other words, in the second manufacture method, the outer shape of the inner through hole HLB in the cross section is in a circular shape, and the outer shape of the core enclosed rod 102 in the cross section is in an elliptic shape. In contrast to this, in the third manufacture method, the outer shape of the inner through hole HLC in the cross section is in an elliptic shape, and the outer shape of the core enclosed rod 72 in the cross section is in a circular shape.

However, as similar to the second manufacture method, in the third manufacture method, the first space SP1 between the inner through hole HLC and the core enclosed rod 72 in the first direction is smaller than the second space SP2 between the inner through hole HLC and the core enclosed rod 72 in the second direction. Moreover, as similar to the second manufacture method, in the third method of manufacture, the difference between the first space SP1 and the second space SP2 is greater than the difference between the third space SP3 and the fourth space SP4.

Therefore, in the third manufacture method, even though the stress applied to the through holes HL is varied, it is possible to deform the core enclosed rod 72 in the inner through hole HLC almost the same as the outer shape of the core enclosed rod 72 in the outer through hole HLA, as similar to the second manufacture method.

Meanwhile, the case where the multicore fibers 2 to 5 are manufactured using the third manufacture method is the same as the case where the multicore fibers 2 to 5 are manufactured using the first manufacture method, and the content is omitted here.

2-4. Fourth Manufacture Method for the Multicore Fiber

Next, a fourth manufacture method for the multicore fiber will be described in detail with reference to the drawing. However, for convenience of explanation, the case will be described where the multicore fiber 1 according to the first embodiment is manufactured using the fourth manufacture method. Moreover, components the same as or equivalent to the components of the methods of manufacture of the multicore fiber are designated the same reference numerals and signs, and the overlapping description will be appropriately omitted.

As similar to the first manufacture method for the multicore fiber, the fourth manufacture method for the multicore fiber includes a boring process P1, an inserting process P2, an integrating process P3, a drawing process P4, and a protective layer forming process P5 as main processes.

In the fourth manufacture method, in the processes P1 to P5, the content of the boring process P1 is different from the first manufacture method for the multicore fiber, and the boring process P1 will be mainly described.

Figure 20:
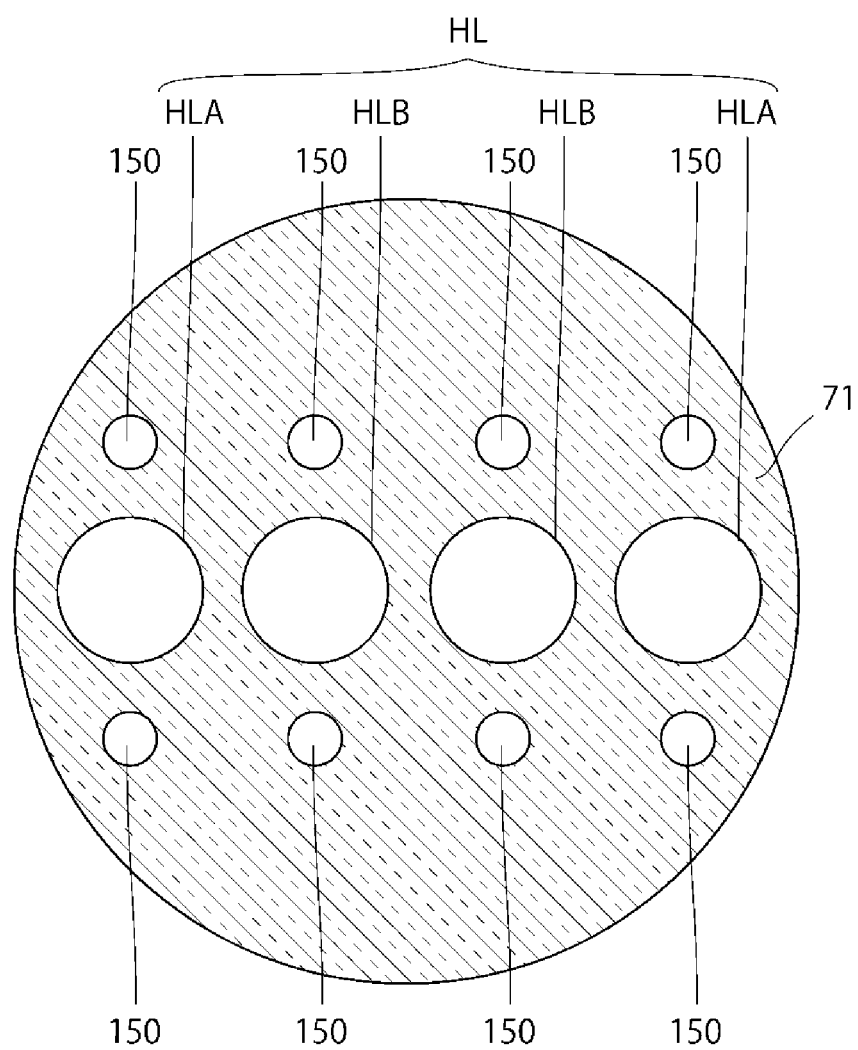
FIG. 20 is a diagram of the appearance after the boring process in a fourth manufacture method for the multicore fiber.

FIG. 20 is a diagram of the appearance after the boring process in the fourth manufacture method for the multicore fiber 1. As illustrated in FIG. 20, in the boring process P1, a stress buffering hole 150 is bored in the cladding rod 71 in addition to the through hole HL in the first manufacture method.

The stress buffering hole 150 is a hole that buffers stress caused in the cladding rod 71 in the integrating process P3, and filled in the integrating process P3. The stress buffering hole 150 is bored in the second direction orthogonal to the first direction in which a plurality of the through holes HL is arranged as the inner through hole HLB is sandwiched.

It is noted that in FIG. 20, the case is illustrated where the cross sectional form of the stress buffering hole 150 is in a circular shape. However, it may be fine that cross sectional forms other than a circular shape are adapted. Moreover, in FIG. 20, the case is illustrated where the cross sectional forms of the stress buffering holes 150 are the same. However, it may be fine that the cross sectional forms are different. Furthermore, in FIG. 20, the case is illustrated where the cross sectional area of the stress buffering hole 150 is different from the cross sectional area of the through hole HL. However, it may be fine that the cross sectional areas are the same.

The stress buffering holes 150 and a plurality of the through holes HL are bored, and then the cladding rod 71 is in turn subjected to the inserting process P2, the integrating process P3, and the drawing process P4. Thus, the core rod 72A of the core enclosed rod 72 is formed as the core 11, and the glass layer 72B and the cladding rod 71 are formed as the cladding 12.

After that, the multicore fiber 1 illustrated in FIG. 1 is manufactured through the protective layer forming process P5.

<Operation and Effect>

As described above, in the fourth manufacture method, a pair of the stress buffering holes 150 filled in the integrating process P3 is bored in the second direction orthogonal to the first direction in which the plurality of the through holes HL is arranged as the inner through hole HLB is sandwiched.

Therefore, even though the stress applied to the inner through hole HLB is greater in the second direction than in the first direction, the amount of stress per unit time applied to the core enclosed rod 72 in the inner through hole HLB is almost the same in the first direction and in the second direction because of the stress buffering holes 150 bored in the second direction.

Accordingly, in the fourth manufacture method, even though the stress applied to the through holes is varied, it is possible to deform the core enclosed rod in the inner through hole almost the same as the shape of the core enclosed rod in the outer through hole.

Meanwhile, the case where the multicore fibers 2 to 5 are manufactured using the fourth manufacture method is the same as the case where the multicore fibers 2 to 5 are manufactured using the first manufacture method, and the content is omitted here.

It is noted that in the case where the multicore fiber 5 is manufactured using the fourth manufacture method, it may be fine that the position of the stress buffering hole 150 to be bored in the cladding rod 71 in the boring process P1 is located between the hole 41 and the hole 51 or between the hole 51 and the outer circumferential surface of the cladding rod 71 as long as the inner through hole HLB is sandwiched in the second direction orthogonal to the first direction.

3. Exemplary Modification

As described above, the methods of manufacture of the multicore fibers 1 to 5 are described as examples. However, the multicore fiber and the method of manufacture of the multicore fiber according to the present invention are not limited to the methods of manufacture of the multicore fibers 1 to 5.

For example, in the first to the fourth manufacture methods, the integrating process P3 is performed and then the drawing process P4 is performed. However, it may be fine that the integrating process P3 and the drawing process P4 are performed at the same time. In the case where the integrating process P3 and the drawing process P4 are performed at the same time, the end working process is performed in which one ends of the cladding rod 71 and the core enclosed rod obtained after subjected to the inserting process P2 are formed in a cone-shaped projection. After that, the cladding rod 71 is placed on a spinning furnace, and the cladding rod 71 is drawn while one ends of the cladding rod 71 and the core enclosed rod are integrally formed using the spinning furnace.

It is noted that in the case where the multicore fiber 4 including the hole 41 or the multicore fiber 5 including the hole 41 and a pair of the holes 51 is manufactured using any one of the first to the fourth manufacture methods, it is necessary to form the holes in drawing the rods while being integrally formed.

More specifically, for example, in drawing one ends of the cladding rod 71 and the core enclosed rod while being integrally formed, a pressure is kept applied to the cladding rod 71 for forming one or both of the hole 41 and the pair of the holes 51. With this configuration, it is possible that one ends of the cladding rod 71 and the core enclosed rod are integrally formed as well as the rods are drawn while forming the holes.

Moreover, the multicore fiber and the method of manufacture of the multicore fiber according to the present invention can be appropriately combined, omitted, modified, and added with publicly known techniques, for example, without deviating from the object of the present application, other than the content described above.

The invention claimed is:

1. A method of manufacture of a multicore fiber comprising:
   boring a plurality of through holes in a cladding rod so that the through holes along a longitudinal direction of the cladding rod are arranged and disposed on a linear line passed through a center of the cladding rod;
   inserting a core enclosed rod that a core rod is enclosed with a glass layer individually into the plurality of the through holes;
   heating the cladding rod and the core enclosed rod and integrally forming the cladding rod with the core enclosed rod; and
   drawing the rods integrally formed in the heating, wherein
   the plurality of the through holes includes a pair of outer through holes located at outermost positions and one or more of inner through holes sandwiched between the pair of the through holes,
   in the inserting, a first space between the core enclosed rod and the inner through hole in a first direction, in which the plurality of through holes is arranged, is made smaller than a second space between the core enclosed rod and the inner through hole in a second direction orthogonal to the first direction, and
   a difference between the first space and the second space is set greater than a difference between a third space and a fourth space, the third space being between the core enclosed rod and the outer through hole in the first direction, the fourth space being between the core enclosed rod and the outer through hole in the second direction.

2. The method of manufacture of a multicore fiber according to claim 1, wherein
   the inner through hole includes a diameter in the first direction almost same as a diameter in the second direction, and
   the core enclosed rod inserted into the inner through hole includes a diameter in the second direction made smaller than a diameter in the first direction.

3. The method of manufacture of a multicore fiber according to claim 2, wherein
   an outer shape of the inner through hole in a cross section is in a circular shape, and
   an outer shape of the core enclosed rod inserted into the inner through hole in a cross section is in an elliptic shape.

4. The method of manufacture of a multicore fiber according to claim 1, wherein
   the inner through hole includes a diameter in the first direction smaller than a diameter in the second direction, and
   the core enclosed rod inserted into the inner through hole includes a diameter in the first direction almost same as a diameter in the second direction.

5. The method of manufacture of a multicore fiber according to claim 4, wherein
   an outer shape of the inner through hole in a cross section is in an elliptic shape, and
   an outer shape of the core enclosed rod in a cross section is in a circular shape.

6. The method of manufacture of a multicore fiber according to claim 1, wherein the integrating and the drawing are performed simultaneously.

7. A method of manufacture of a multicore fiber comprising:
   boring a plurality of through holes in a cladding rod so that the through holes along a longitudinal direction of the cladding rod are arranged and disposed on a linear line passed through a center of the cladding rod;
   inserting a core enclosed rod that a core rod is enclosed with a glass layer individually into the plurality of the through holes;
   heating the cladding rod and the core enclosed rod and integrally forming the cladding rod with the core enclosed rod; and
   drawing the rods integrally formed in the heating, wherein
   the plurality of the through holes includes a pair of outer through holes located at outermost positions and one or more of inner through holes sandwiched between the pair of the through holes, and
   in the boring, a pair of stress buffering holes filled in the integrating is bored in the second direction as the inner through hole is sandwiched.

8. The method of manufacture of a multicore fiber according to claim 7, wherein the integrating and the drawing are performed simultaneously.

9. A method of manufacture of a multicore fiber comprising:
   boring a plurality of through holes in a cladding rod so that the through holes along a longitudinal direction of the cladding rod are arranged and disposed on a linear line passed through a center of the cladding rod;

inserting a core enclosed rod that a core rod is enclosed with a glass layer individually into the plurality of the through holes;

heating the cladding rod and the core enclosed rod and integrally forming the cladding rod with the core enclosed rod; and drawing the rods integrally formed in the heating, wherein the plurality of the through holes includes a pair of outer through holes located at outermost positions and one or more of inner through holes sandwiched between the pair of the through holes, the core rod in the core enclosed rod inserted into the outer through hole in the inserting includes a diameter in a first direction, in which the plurality of the through holes is arranged, almost same as a diameter in a second direction orthogonal to the first direction, and the core rod in the core enclosed rod inserted into the inner through hole in the inserting includes a diameter in the first direction smaller than a diameter in the second direction.

10. The method of manufacture of a multicore fiber according to claim 9, wherein the integrating and the drawing are performed simultaneously.

* * * * *